United States Patent
Wakita et al.

(10) Patent No.: US 8,600,635 B2
(45) Date of Patent: Dec. 3, 2013

(54) CONTROL DEVICE FOR AUTOMATIC TRANSMISSION

(75) Inventors: Kazuyoshi Wakita, Saitama (JP); Yoshiyuki Nagayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 13/168,231

(22) Filed: Jun. 24, 2011

(65) Prior Publication Data

US 2012/0004818 A1  Jan. 5, 2012

(30) Foreign Application Priority Data

Jun. 28, 2010 (JP) ................................. 2010-146932

(51) Int. Cl.
*G06F 7/00* (2006.01)
(52) U.S. Cl.
USPC ............. 701/66; 701/67; 701/64; 701/55; 701/54; 74/552; 74/473.12; 74/335; 477/97; 477/79; 477/50; 477/116
(58) Field of Classification Search
USPC ............. 701/31.4, 51, 52, 54, 55, 36, 335; 475/116, 131, 121, 125, 50, 64, 79, 99; 74/335, 336 R, 473.12, 473.18; 477/121, 125, 50, 64, 79, 99, 115, 34
See application file for complete search history.

(56) References Cited

U.S. PATENT DOCUMENTS

| | | | | |
|---|---|---|---|---|
| 5,050,717 A | * | 9/1991 | Shibayama | 477/64 |
| 5,425,686 A | * | 6/1995 | Grange | 477/79 |
| 5,916,292 A | * | 6/1999 | Issa et al. | 701/62 |
| 6,223,112 B1 | * | 4/2001 | Nishino | 701/55 |
| 6,361,464 B1 | * | 3/2002 | Yoneyama | 475/116 |
| 6,363,805 B1 | | 4/2002 | Marchart | |
| 7,603,924 B2 | * | 10/2009 | Mandou et al. | 74/335 |
| 2006/0014610 A1 | * | 1/2006 | Matsunaga et al. | 477/121 |
| 2007/0204710 A1 | * | 9/2007 | Mandou et al. | 74/335 |
| 2008/0221760 A1 | * | 9/2008 | Wakamatsu et al. | 701/52 |
| 2010/0010716 A1 | * | 1/2010 | Sawada et al. | 701/52 |

FOREIGN PATENT DOCUMENTS

| | | |
|---|---|---|
| EP | 2 101 086 A1 | 9/2009 |
| EP | 2101086 A1 * | 9/2009 |
| JP | 07-301321 A | 11/1995 |
| JP | 9-203457 A | 8/1997 |

(Continued)

OTHER PUBLICATIONS

JPO machine translation —jp2006194399.pdf Inventor: Kim K Y Published Jul. 27, 2006.*

(Continued)

*Primary Examiner* — Tuan C. To
*Assistant Examiner* — Jelani Smith
(74) *Attorney, Agent, or Firm* — Carrier Blackman & Associates, P.C.; Joseph P. Carrier; Jeffrey T. Gedeon

(57) ABSTRACT

When a select lever is in a drive range, a microcomputer reads a value of an output voltage by a switch-operation-signal output circuit after detecting that both shift-up switch and shift-down switch are substantially simultaneously turned on, checks whether or not the output voltage by the switch-operation-signal output circuit is the output voltage indicating that the switch after a predetermined time has elapsed is in a normal condition, and only when the output voltage is such an output voltage, permits a manual mode of an automatic transmission and when the output voltage is not such an output voltage, cancels the manual mode.

9 Claims, 14 Drawing Sheets

(56) References Cited

FOREIGN PATENT DOCUMENTS

| JP | 2000-283281 A | 10/2000 |
| JP | 2002-362180 A | 12/2002 |
| JP | 2007-118759 A | 5/2007 |
| JP | 2007-232093 A | 9/2007 |
| JP | 2008-037312 A | 2/2008 |

OTHER PUBLICATIONS

EP2101086A1_Machine Translation_english.*

* cited by examiner

FIG.4A

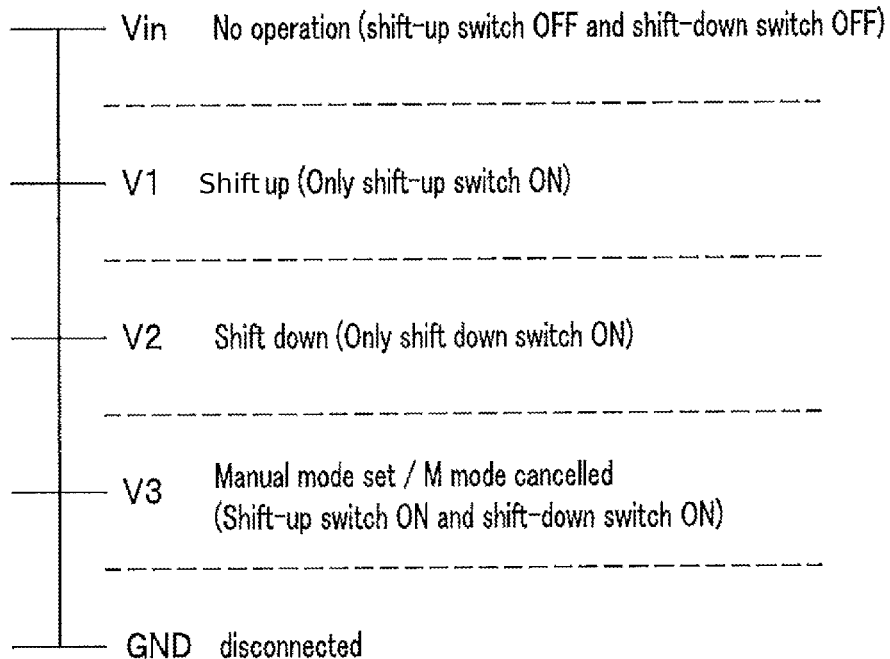

- Vin — No operation (shift-up switch OFF and shift-down switch OFF)
- V1 — Shift up (Only shift-up switch ON)
- V2 — Shift down (Only shift down switch ON)
- V3 — Manual mode set / M mode cancelled (Shift-up switch ON and shift-down switch ON)
- GND — disconnected

FIG.4B

| On patterns of shift-up switch and shift-down switch | Output voltage | Operation status |
| --- | --- | --- |
| There is no ON-state in contacts | Vout=Vin | Normal |
| Only shift-up switch On | Vout=V1≒Voltage divided by R4 | Shift up |
| Only shift-down switch On | Vout=V2≒Voltage divided by R2 | Shift down |
| Shift-up switch and Shift-down switch Both On at the same time | Vout=V3≒Voltage divided by all the registers | Manual mode set / cancelled |
| Disconnected | Vout≒GND | Signal line disconnected |

CONTROL DEVICE FOR AUTOMATIC TRANSMISSION

CROSS REFERENCE TO RELATED APPLICATION

The application claims the foreign priority benefit under Title 35, United States Code, Section 119(a)-(d) of Japanese Patent Application No. 2010-146932 filed on Jun. 28, 2010, the content of which is hereby incorporated by reference.

BACKGROUND OF THE INVENTION

1. Field of the Invention

The present invention relates to a control device for an automatic transmission having an automatic mode and a manual mode.

2. Description of the Related Arts

Conventional selector devices for an automatic transmission with a manual mode can be classified into three operation modes.

For example, JP 2002-362180 A (see FIGS. 7, 11 and 12) discloses a selector device that has a manual mode position (M) for allowing a manual operation of a select lever. According to this selector device, the transmission gear of the automatic transmission is shifted up or shifted down through an operation of the select lever in the back-and-forth direction from the manual mode position. The operation path of the selector device is a so-called H type, and is formed so that the select lever operated to the drive position (D) can be operated to the manual mode position.

Also, JP 2000-283281 A (see FIG. 1) discloses a selector device which is a type of performing gear shifting through a selector switch provided at a steering wheel and a paddle switch and the selector device itself has no manual mode position for a manual operation. The selector switch is for changing the transmission gears of the automatic transmission to be in either one of the automatic mode or the manual mode, and is provided at the spoke of the steering wheel at the front side. The paddle switch is provided at the spoke of the steering wheel at the rear side, and includes a shift-up switch for shifting up the transmission gears and a shift-down switch for shifting down the transmission gears. In this case, a control device includes a manual mode controller that controls a manual mode.

Also, JP 2007-232093 A (see FIGS. 1 to 5 and 8) discloses a prior art which is a selector device shown in FIG. 8 thereof. This selector device includes a select pattern for an automatic operation path and a manual operation path, and a mode can be changed to a first manual mode at a drive position. The mode can be further changed to a second manual mode at the manual mode position. The selector device is electrically connected to a control device that includes a first manual mode controller and a second manual mode controller with a different transmission gear operation from the first manual mode controller.

However, according to the selector device disclosed in JP 2002-362180 A, when the mode is changed between the automatic mode and the manual mode, it is necessary to release a hand holding the steering wheel in order to operate the select lever from the drive position to the manual mode position, so that the operability is poor.

Also, according to the selector device disclosed in JP 2000-283281 A, it is necessary to provide the selector switch that changes the mode between the automatic mode and the manual mode at the steering wheel. Accordingly, the circuit wiring of the steering wheel, etc., becomes complex.

According to the selector device that is a prior art disclosed in FIG. 8 of JP 2007-232093 A, it is necessary to provide exclusive manual operation path and manual mode position (M) for a manual operation, so that the selector device becomes complex.

Hence, JP 2007-232093 A discloses, in FIGS. 1 to 5, a prior art that is a control device for an automatic transmission which can be operated in first or second manual mode different from each other with the select position of the selector device being maintained in the forward position including a first forward position and a second forward position. According to this prior art, for example, the first and second forward positions are arbitrary select positions of the selector device which cause a vehicle to run forward, respectively, such as a drive position, a low position, a D2 position, and a D3 position.

Also, the steering wheel includes operation means that is a shift-up switch which commonly shifts up the first manual mode and the second manual mode and a shift-down switch that commonly shifts down those modes. When the control device detects that either one of the shift-up switch or the shift-down switch is operated, the automatic mode is changed to the first manual mode or the second manual mode corresponding to the select position of the selector device.

Meanwhile, JP 2007-232093 A also discloses a prior art which causes the automatic transmission to return to an original automatic mode like a drive range when a certain time elapses after the selector device is set to a position corresponding to the first manual mode.

Also, JP 2007-118759 A (see FIGS. 1 and 2) discloses a technology for a range-change control device of an automatic transmission. According to this range-change control device, right and left paddle switches are provided at the right and left of the steering wheel as a selector device in addition to a parking switch. The right and left paddle switches are operable back and forth, and the range-change control device is configured to detect in which direction each paddle switch is operated in the backward direction or the forward direction.

According to this range-change control device for an automatic transmission, when a transmission controller detects the simultaneous backward operation to the right and left paddle switches, it is determined that the range is changed to a reverse ("R") range in order to control the automatic transmission. Also, when the transmission controller detects the simultaneous frontward operation to the right and left paddle switches, it is determined that the range is changed to a drive ("D") range in order to control the automatic transmission.

According to the prior art disclosed in JP 2007-118759 A, when detecting that the right paddle switch is operated in the frontward direction with the automatic transmission being in the D range, the transmission controller determines that a manual shift range M+ (manual shift-up range) is selected and performs a control so that the automatic transmission is shifted up by one gear range every time the frontward operation to the right paddle switch is detected. Likewise, when detecting that the left paddle switch is operated in the frontward direction with the automatic transmission being in the D range, the transmission controller determines that a manual shift range M− (manual shift-down range) is selected and performs a control so that the automatic transmission is shifted down by one gear range every time the forward operation to the left paddle switch is detected.

However, according to the prior art disclosed in FIGS. 1 to 4 of JP 2007-232093 A and the prior art disclosed in FIGS. 1 and 4 of JP 2007-118759 A, when the automatic transmission is in the D range, if a driver falsely touches either one of the shift-up switch or the shift-down switch provided at the steering wheel, or when the driver falsely touches either one of the right paddle switch or the left paddle switch, the automatic transmission is changed to a manual mode that is not intended by the driver, so that the driver may feel strangeness.

The present invention is made in order to overcome the problems of the above-explained prior art, and it is an object of the present invention to provide a control device for an automatic transmission which is capable of changing a mode of the automatic transmission between an automatic mode and a manual mode while a driver keeps holding a steering wheel with the select position of a selector device being in a forward position, and which is capable of surely changing the mode intended by the driver between the automatic mode and the manual mode.

SUMMARY OF THE INVENTION

In order to solve the above-described problem, the present invention in a first aspect provides a control device for an automatic transmission that is operated in an automatic mode in which a gear range of the automatic transmission is automatically controlled and a manual mode in which the gear range is changeable one by one upon operation of either one of a shift-up switch and a shift-down switch, wherein the control device activates the manual mode only when both shift-up switch and shift-down switch are operated within a predetermined first threshold time.

According to the first aspect of the present invention, for example, when the shift-up switch and a shift-down switch are provided at a steering wheel, a mode change between the manual mode and the automatic mode is facilitated without any operation to a select lever, and only when both of the shift-up switch and the shift-down switch are turned on within the predetermined first threshold time, i.e., substantially simultaneously or when each of such switches is individually turned on within a short time, a mode change from the automatic mode to the manual mode is activated.

As a result, when a driver turns the steering wheel or operates other switches, even if the driver falsely touches either one of the shift-up switch and the shift-down switch and turns on such a switch, a mode change from the automatic mode to the manual mode is not activated and only when the driver intentionally turns on both of the shift-up switch and the shift-down switch within the predetermined first threshold time, a mode change is surely performed from the automatic mode to the manual mode.

Also, in the manual mode, when the driver intentionally turns on both of the shift-up switch and the shift-down switch within the predetermined first threshold time, a mode change from the manual mode to the automatic mode is also facilitated.

The present invention in a second aspect includes, in addition to the configuration of the first aspect of the present invention, a switch-operation-signal output circuit that outputs different output voltages at least when only the shift-up switch is turned on and when only the shift-down switch is turned on; and an operation determination unit which determines a mode change between the automatic mode and the manual mode based on the output voltage by the switch-operation-signal output circuit and which determines a change of the gear range in the manual mode, wherein the switch-operation-signal output circuit allows the control device to change the mode of the automatic transmission between the automatic mode and the manual mode and to change the gear range based on an output voltage by the switch-operation-signal output circuit, and keeps outputting, when both shift-up switch and shift-down switch are in an off-state, a predetermined first output voltage which is different from an output voltage output when only the shift-up switch is turned on and an output voltage output when only the shift-down switch is turned on.

According to the second aspect of the present invention, the switch-operation-signal output circuit outputs not only different voltages when only the shift-up switch is turned on and only the shift-down switch is turned on but also the first output voltage different from those output voltages when both of the shift-up switch and the shift-down switch are turned off. As a result, the operation determination unit can easily determine that either one of the shift-up switch and the shift-down switch is in an on-state fixed defective condition.

Also, when both shift-up switch and shift-down switch are turned off, the first output voltage is always output, so that a condition in which no voltage is output by the switch-operation-signal output circuit, i.e., a disconnection defect can be easily detected.

The present invention in a third aspect includes, in addition to the configuration of the present invention according to the second aspect, a configuration where the switch-operation-signal output circuit outputs a second output voltage different from the first output voltage when the shift-up switch is turned on, outputs a third output voltage different from the first and second output voltages when the shift-down switch is turned on, and outputs a fourth output voltage different from the first, second and third output voltages when the shift-up switch and the shift-down switch are simultaneously turned on, the operation determination unit monitors the output voltage by the switch-operation-signal output circuit at least once after an engine is started through an ignition key during a second threshold time that is longer than the predetermined first threshold time, and when detecting no first output voltage, determines that the switch-operation-signal output circuit is defective and prohibits a mode change to the manual mode.

According to the third aspect of the present invention, the switch-operation-signal output circuit outputs the second output voltage different from the first output voltage when the shift-up switch is turned on, outputs the third output voltage different from the first and second output voltages when the shift-down switch is turned on, and outputs the fourth output voltage different from the first, second and third output voltages when the shift-up switch and the shift-down switch are simultaneously turned on. Accordingly, it is possible to distinguish the cases in which the shift-up switch is turned on and is in a fixed defective condition, the shift-down switch is turned on and is in a fixed defective condition, both shift-up switch and shift-down switches are turned on and are in a fixed defective condition, and a disconnection defect occurs so that no power is supplied to the switch-operation-signal output circuit, and to perform a defect determination of the switch-operation-signal output circuit.

Also, the output voltage by the switch-operation-signal output circuit is monitored at least once during the second threshold time longer than the predetermined first threshold time after the engine is started through the ignition key. Accordingly, a defect determination of the switch-operation-signal output circuit can be performed with little false defect determination due to noise signals and a false touching to the shift-up switch and the shift-down switch.

Furthermore, when it is determined that the switch-operation-signal output circuit is defective, a mode change to the manual mode is prohibited, so that a false mode change of the automatic transmission from the automatic mode to the manual mode is prevented.

The present invention in a fourth aspect includes, in addition to a configuration of the present invention according to the second and third aspects, a configuration where the switch-operation-signal output circuit outputs a second output voltage different from the first output voltage when the shift-up switch is turned on, outputs a third output voltage different from the first and second output voltages when the shift-down switch is turned on, and outputs a fourth output voltage different from the first, second and third output voltages when the shift-up switch and the shift-down switch are simultaneously turned on, the operation determination unit monitors whether or not the output voltage output after a third threshold time has elapsed recovers to the first output voltage when both shift-up switch and shift-down switch are operated within the predetermined first threshold time, and when detecting that the output voltage by the switch-operation-signal output circuit does not recover to the first output voltage after the third threshold time has elapsed, determines that at least either one of the shift-up switch and the shift-down switch is defective.

According to the fourth aspect of the present invention, the switch-operation-signal output circuit outputs the second output voltage different from the first output voltage when the shift-up switch is turned on, outputs the third output voltage different from the first and second output voltages when the shift-down switch is turned on, and outputs the fourth output voltage different from the first, second and third output voltages when the shift-up switch and the shift-down switch are simultaneously turned on. Accordingly, it is possible to distinguish the cases in which the shift-up switch is turned on and is in a fixed defective condition, the shift-down switch is turned on and is in a fixed defective condition, both shift-up switch and shift-down switches are turned on and are in a fixed defective condition, and a disconnection defect occurs so that no power is supplied to the switch-operation-signal output circuit, and to perform a defect determination of the switch-operation-signal output circuit.

The operation determination unit monitors whether or not the output voltage after a third threshold time has elapsed recovers to the first output voltage when both shift-up switch and shift-down switch are operated within the predetermined first threshold time, and when detecting that the output voltage by the switch-operation-signal output circuit does not recover to the first output voltage after the third threshold time has elapsed, determines that at least either one of the shift-up switch and the shift-down switch is defective.

As a result, when detecting that both shift-up switch and shift-down switch are operated within the predetermined first threshold time, the operation determination unit monitors whether or not the output voltage after the third threshold time has elapsed recovers to the first output voltage, and then determines whether or not the switch-operation-signal output circuit is defective, so that a false defect determination is less. That is, the possibility that both shift-up switch and shift-down switch are in a fixed defective condition is lower than the possibility that either one of the shift-up switch and the shift-down switch is in a fixed defective condition, and the possibility of detecting a defect of the switch-operation-signal output circuit becomes high, so that the reliability of the false determination of the switch-operation-signal output circuit is improved.

Also, when both shift-up switch and shift-down switch are operated within the predetermined first threshold time, it is possible to cope with a mode change operation by, for example, the driver intentionally operating both shift-up switch and shift-down switch within the predetermined first threshold time to change the automatic transmission from the automatic mode to the manual mode or an opposite mode change operation from the manual mode to the automatic mode, and a mode change from the automatic mode to the manual mode can be cancelled or a forcible mode change from the manual mode to the automatic mode can be performed with respect to a false defect determination of the switch-operation-signal output circuit by the operation determination unit.

The present invention of a fifth aspect includes, in addition to the configuration of the present invention according to the second and third aspects, a configuration where the switch-operation-signal output circuit outputs a second output voltage different from the first output voltage when the shift-up switch is turned on, outputs a third output voltage different from the first and second output voltages when the shift-down switch is turned on, and outputs a fourth output voltage different from the first, second and third output voltages when the shift-up switch and the shift-down switch are simultaneously turned on, the operation determination unit monitors whether or not the output voltage output after a third threshold time has elapsed recovers to the first output voltage when both shift-up switch and shift-down switch are operated within the predetermined first threshold time, and when detecting that the output voltage by the switch-operation-signal output circuit does not recover to the first output voltage after the third threshold time has elapsed, prohibits a mode change to the manual mode when the automatic transmission is in the automatic mode, and permits a mode change to the automatic mode when the automatic transmission is in the manual mode.

According to the fifth aspect of the present invention, the switch-operation-signal output circuit outputs the second output voltage different from the first output voltage when the shift-up switch is turned on, outputs the third output voltage different from the first and second output voltages when the shift-down switch is turned on, and outputs the fourth output voltage different from the first, second and third output voltages when the shift-up switch and the shift-down switch are simultaneously turned on.

Accordingly, it is possible to distinguish the cases in which the shift-up switch is turned on and is in a fixed defective condition, the shift-down switch is turned on and is in a fixed defective condition, both shift-up switch and shift-down switches are turned on and are in a fixed defective condition, and a disconnection defect occurs so that no power is supplied to the switch-operation-signal output circuit, and to perform a defect determination of the switch-operation-signal output circuit.

The operation determination unit monitors whether or not the output voltage after a third threshold time has elapsed recovers to the first output voltage when both shift-up switch and shift-down switch are operated within the predetermined first threshold time, and when detecting that the output voltage by the switch-operation-signal output circuit does not recover to the first output voltage after the third threshold time has elapsed, prohibits a mode change to the manual mode when the automatic transmission is in the automatic mode, and permits a mode change to the automatic mode when the automatic transmission is in the manual mode.

As a result, when both shift-up switch and shift-down switch are operated within the predetermined first threshold time, it is possible to cope with a mode change operation by, for example, the driver intentionally operating both shift-up switch and shift-down switch within the predetermined first threshold time to change the automatic transmission from the automatic mode to the manual mode or an opposite mode change operation from the manual mode to the automatic mode, and the operation determination unit can cancel a mode change from the automatic mode to the manual mode or can forcibly change the mode from the manual mode to the automatic mode, so that the mode change to the manual mode is prohibited when the shift-up switch or the shift-down switch is unable to operate normally, and a normal driving in the automatic mode is maintained.

The present invention in a sixth aspect includes, in addition to the configuration of the present invention according to the fourth aspect, a configuration where the operation determination unit monitors whether or not the output voltage output after a third threshold time has elapsed recovers to the first output voltage when both shift-up switch and shift-down switch are operated within the predetermined first threshold time, and when detecting that the output voltage by the switch-operation-signal output circuit does not recover to the first output voltage after the third threshold time has elapsed, determines that at least either one of the shift-up switch and the shift-down switch is defective and prohibits a mode change to the manual mode when the automatic transmission is in the automatic mode, and determines that at least either one of the shift-up switch and the shift-down switch is defective and permits a mode change to the automatic mode when the automatic transmission is in the manual mode.

According to the sixth aspect of the present invention, the advantages of the fourth aspect of the present invention set forth in paragraphs 0026 to 0028 and advantages of the fifth aspect of the present invention set forth in paragraphs 0030 and 0031 can be both accomplished.

In accordance with the present invention, a control device for an automatic transmission can be provided which is capable of changing a mode of the automatic transmission between an automatic mode and a manual mode while a driver keeps holding a steering wheel with the select position of a selector device being in a forward position, and which is capable of surely changing the mode intended by the driver between the automatic mode and the manual mode.

BRIEF DESCRIPTION OF THE DRAWINGS

FIG. 4A is an explanatory diagram for an output voltage by the switch-operation-signal output circuit;

FIG. 4B is an explanatory diagram of an operation of the automatic-transmission control device;

FIG. 11A is a time chart of an operation to the shift-up SW, FIG. 11B is a time chart of an operation to the shift-down SW, and FIG. 11C is an explanatory diagram for a change in an output voltage by the switch-operation-signal output circuit and the control state of the automatic transmission;

FIG. 12A is a time chart of an operation to the shift-up SW, FIG. 12B is a time chart of an operation to the shift-down SW, and FIG. 12C is an explanatory diagram for a change in an output voltage by the switch-operation-signal output circuit for a mode change determination between the automatic mode and the manual mode;

FIG. 13A is a time chart of an operation to the shift-up SW, FIG. 13B is a time chart of an operation to the shift-down SW, and FIG. 13C is an explanatory diagram for a change in an output voltage by the switch-operation-signal output circuit for a mode change determination between the automatic mode and the manual mode; FIG. 14A is an explanatory diagram for a mode change termination to the manual mode when the shift-up SW is in a defective condition in which it is fixed in an on-state, and FIG. 14B is an explanatory diagram for a mode change termination to the manual mode when the shift-down SW is in a defective condition in which it is fixed in an on-state.

DETAILED DESCRIPTION OF THE PREFERRED EMBODIMENTS

An illustrative control device for an automatic transmission according to an embodiment of the present invention will be explained with reference to FIGS. 1 to 4.

Figure 1:
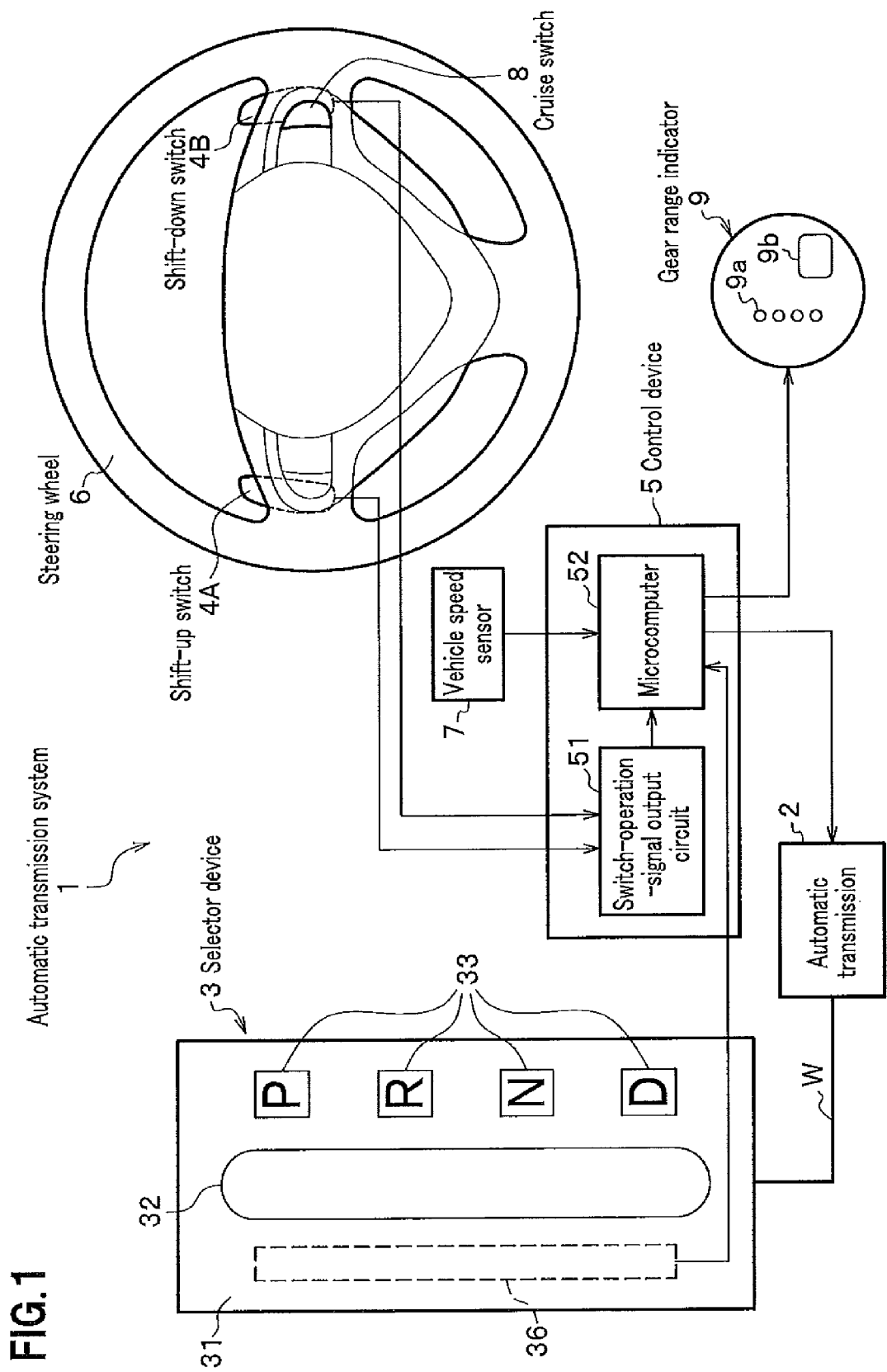
FIG. 1 is a block explanatory diagram for a control device for an automatic transmission.
Figure 2A:
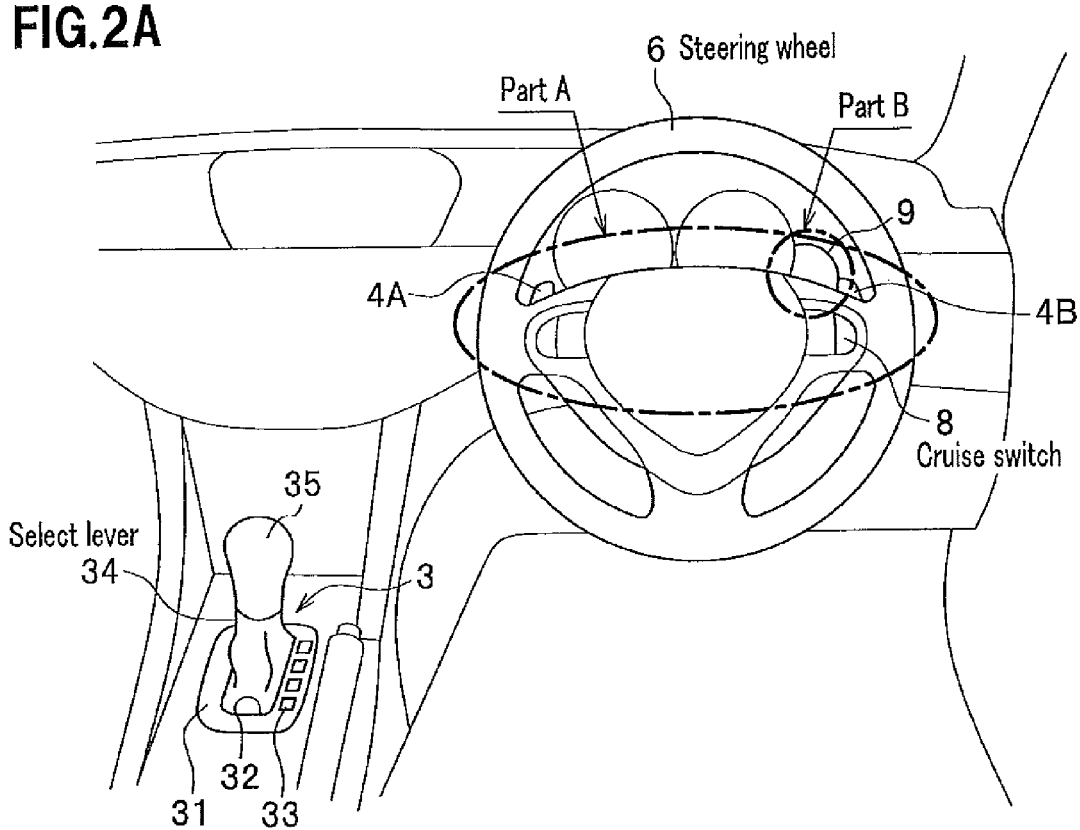
FIG. 2A is a perspective view showing the automatic-transmission control device according to an embodiment of the present invention.
Figure 2B:
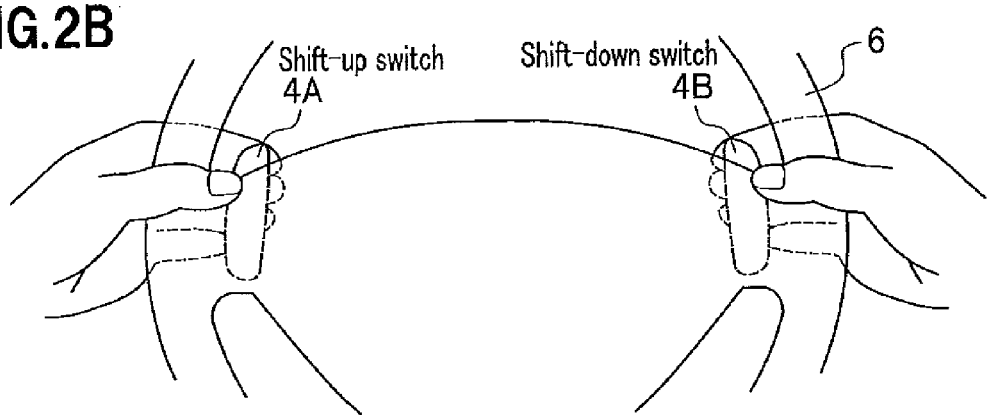
FIG. 2B is an enlarged view of a part A in FIG. 2A.
Figure 2C:
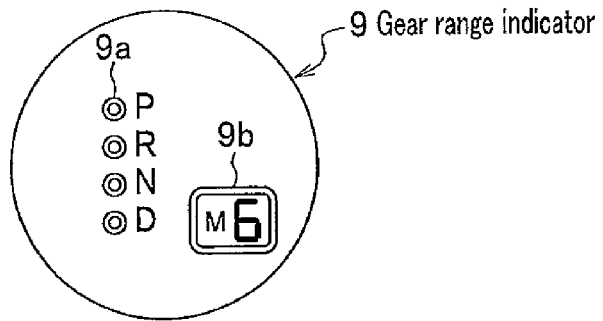
FIG. 2C is an enlarged view of a part B in FIG. 2A.

FIG. 1 is a block explanatory diagram for a control device for an automatic transmission. FIG. 2A is a perspective view showing the automatic-transmission control device according to an embodiment of the present invention. FIG. 2B is an enlarged view of a part A in FIG. 2A, and FIG. 2C is an enlarged view of a part B in FIG. 2A.

First, prior to an explanation for a control device 5 of an automatic transmission 2 (see FIG. 1) according to an embodiment of the present invention, an explanation will be given of the automatic transmission 2 of a vehicle built with the control device 5 (see FIG. 1) and an automatic transmission system 1 (see FIG. 1).

<<Configuration of Automatic Transmission System>>

As shown in FIG. 1, the automatic transmission system 1 has an automatic mode in which the control device 5 automatically controls the gear range of the automatic transmission 2 by, for example, setting the select position of a selector device 3 to be a drive position (a position indicated by "D" in FIG. 1), and a manual mode of changing the gear range one range by one range through an operation to operation means which is a shift-up switch 4A (hereinafter, referred to as a "shift-up SW 4A") and a shift-down switch 4B (hereinafter, referred to as a "shift-down SW 4B") other than the selector device 3 while the select position of the selector device 3 is maintained at the drive position.

The automatic transmission system 1 includes the selector device 3 with a drive position, the shift-up SW 4A and the shift-down SW 4B which are provided at a steering wheel 6, change the mode of the automatic transmission system 1 to be the manual mode when operated with the select position of the selector device 3 being at the drive position, and shift up or down the gear range of the automatic transmission 2, the control device 5 that controls the automatic transmission 2 based on signals (a selector select signal, a switch operation signal) from the selector device 3, the shift-up SW 4A and the shift-down SW 4B, the automatic transmission 2, and a vehicle speed sensor 7 that detects a vehicle speed.

The control device 5 configures an electric circuit together with the shift-up SW 4A and the shift-down SW 4B. The control device 5 at least includes a switch-operation-signal output circuit (switch-operation-signal output means) 51 which changes an output voltage in accordance with an on/off-state of each switch and inputs the output voltage into a microcomputer (operation determining means) 52, and the microcomputer 52 which controls the automatic transmission 2 to change the mode between the automatic mode and the manual mode based on the selector select signal input from the selector device 3, a vehicle speed signal from the vehicle speed sensor 7, and the output voltage by the switch-operation-signal output circuit 51, and which changes and controls the gear range in the manual mode.

The microcomputer 52 also controls a display by a gear range indicator 9 disposed as a part of a meter display panel disposed ahead of a driver seat. The gear range indicator 9 is provided with a select position indicator light 9a that lights up in accordance with the operation position of the selector device 3, and a gear range indicator window 9b indicating the automatic mode or a gear range in the manual mode in the drive-range-D state. In FIG. 2C, the gear range indicator window 9b indicates "M6" as an example which indicates that the gear range is "6" in the manual mode.

The microcomputer 52 includes a CPU, an input/output interface circuit, a ROM, a RAM, and buses, and executes the functions of the control device 5 to be discussed later by causing the CPU to run a program stored in the ROM beforehand.

As shown in FIG. 2B, the shift-up SW 4A and the shift-down SW 4B are arranged at the back side of the spoke of the steering wheel 6, and the shift-up SW 4A can be clicked with a left finger from the back and the shift-down SW 4B can be clicked with a right finger from the back with the steering wheel 6 being held by the right and left hands.

For reference, the steering wheel 6 is also provided with a cruise SW 8.

<<Configuration of Automatic Transmission>>

The automatic transmission 2 shown in FIG. 1 is a device that automatically operates a clutch and a transmission. The automatic transmission 2 has, for example, a parking range P corresponding to the parking position of the selector device 3, a reverse range R corresponding to the reverse position of the selector device 3, a neutral range N corresponding to the neutral position of the selector device 3, a drive range D corresponding to the drive position of the selector device 3, and a manual mode which can correspond to an operation when the shift-up SW 4A and the shift-down SW 4B are substantially simultaneously operated in the drive range D of the selector device 3. The automatic transmission 2 is operated through an operation given by a driver to a select lever 34 (see FIG. 2) of the selector device 3 and through an operation to the shift-up SW 4A and the shift-down SW 4B which are operation means other than the selector device 3. The automatic transmission 2 is electrically connected to the control device 5, and is controlled by the control device 5.

<<Configuration of Selector Device>>

As shown in FIG. 2A, the selector device 3 is an operation device that changes the range of the automatic transmission 2 (see FIG. 1) through the select lever 34. The selector device 3 selects any one of the four select positions, i.e., the parking position, the reverse position, the neutral position and the drive position in this embodiment. For example, the selector device 3 is attached to the floor between the driver seat and the passenger seat in a manner that the select lever 34 protrudes therefrom. The selector device 3 includes the select lever 34 disposed freely movable in a plurality of select positions, an escutcheon cover 31 that guides the select lever 34 in an operational direction, an unillustrated detent mechanism that holds the select lever 34 at each select position, and a select position switch 36 that detects a position of the select lever 34. In the following explanation, the select position switch 36 will be referred to as a "select position SW 36".

The select position SW 36 is a detection switch that detects a select position selected by an operation given to the select lever 34 (see FIG. 2A), and can detect individual select positions. The select position SW 36 includes a movable contact that moves together with the select lever 34, and fixed contacts of respective positions to which the movable contact touches and which is turned on when the select lever 34 is operated to each select position.

The select position SW 36 outputs a selector select signal in accordance with the select position to the control device 5 (see FIG. 1).

<Configuration of Select Lever>

The select lever 34 shown in FIG. 2A is inserted in an operation path 32 that is a groove formed in the escutcheon cover 31 attached to the floor, and is swung in the back-and-forth direction for example, thereby being operated to each select position. The select lever 34 has a select knob 35 at the tip thereof. The basal end of the select lever 34 is connected to a wire W (see FIG. 1) for transmitting an operation and movement of the select lever 34 to the automatic transmission 2.

<Configuration of Escutcheon Cover>

The escutcheon cover 31 is a tabular member for forming the groove that is the operation path 32 for forming the select patterns of the select lever 34, and also serves as a face plate 33 indicating the select position (see FIG. 1 indicating "P", "R", "N", and "D") of the selector device 3.

As shown in FIG. 2A, the operation path 32 is a groove that regulates and guides the operation direction of the select lever 34 which is subjected to a select operation by the driver and is swung. The operation path 32 is, for example, a linear groove running along the back-and-forth direction of the vehicle. The operation path 32 has the parking position at the front end corresponding to the parking range P, the reverse position at the front of the parking position corresponding to the reverse range R, the neutral position at the center of the front of the reverse position corresponding to the neutral range N, and the drive position at the front of the neutral position corresponding to the drive range D.

Added to the side of the operation path 32 of the escutcheon cover 31 (see FIG. 2A) are symbols, such as "P" indicating the parking range set for the automatic transmission 2, "R" indicating the reverse range, "N" indicating the neutral range, and "D" indicating the drive range.

<<Shift-Up SW and Shift-Down SW>>

The shift-up SW 4A and the shift-down SW 4B are for changing the mode from the automatic mode to the manual mode or vice versa from the manual mode to the automatic mode, and for enabling a manual shift-up or shift-down operation of the gear range of the automatic transmission 2 in the manual mode. The shift-up SW 4A and the shift-down SW 4B are provided at the left and right spokes of the steering wheel 6, respectively. The shift-up SW 4A and the shift-down SW 4B are provided at the back of respective spokes at respective positions where a middle finger or a fourth finger can reach and such a switch can be operated while the driver is holding the steering wheel 6. The shift-up SW 4A and the shift-down SW 4B are often called paddle switches or up-down switches.

The shift-up SW 4A is for a shift-up operation of the gear range of the automatic transmission 2 and the shift-down SW 4B is for a shift-down operation of the gear range of the automatic transmission 2. The shift-up SW 4A is provided at, for example, the left spoke of the steering wheel 6 in a steering condition in which the vehicle is going straight. The shift-down SW 4B is provided at, for example, the right spoke of the steering wheel 6 in a steering condition in which the vehicle is going straight.

<<Switch-Operation-Signal Output Circuit>>

Figure 3:
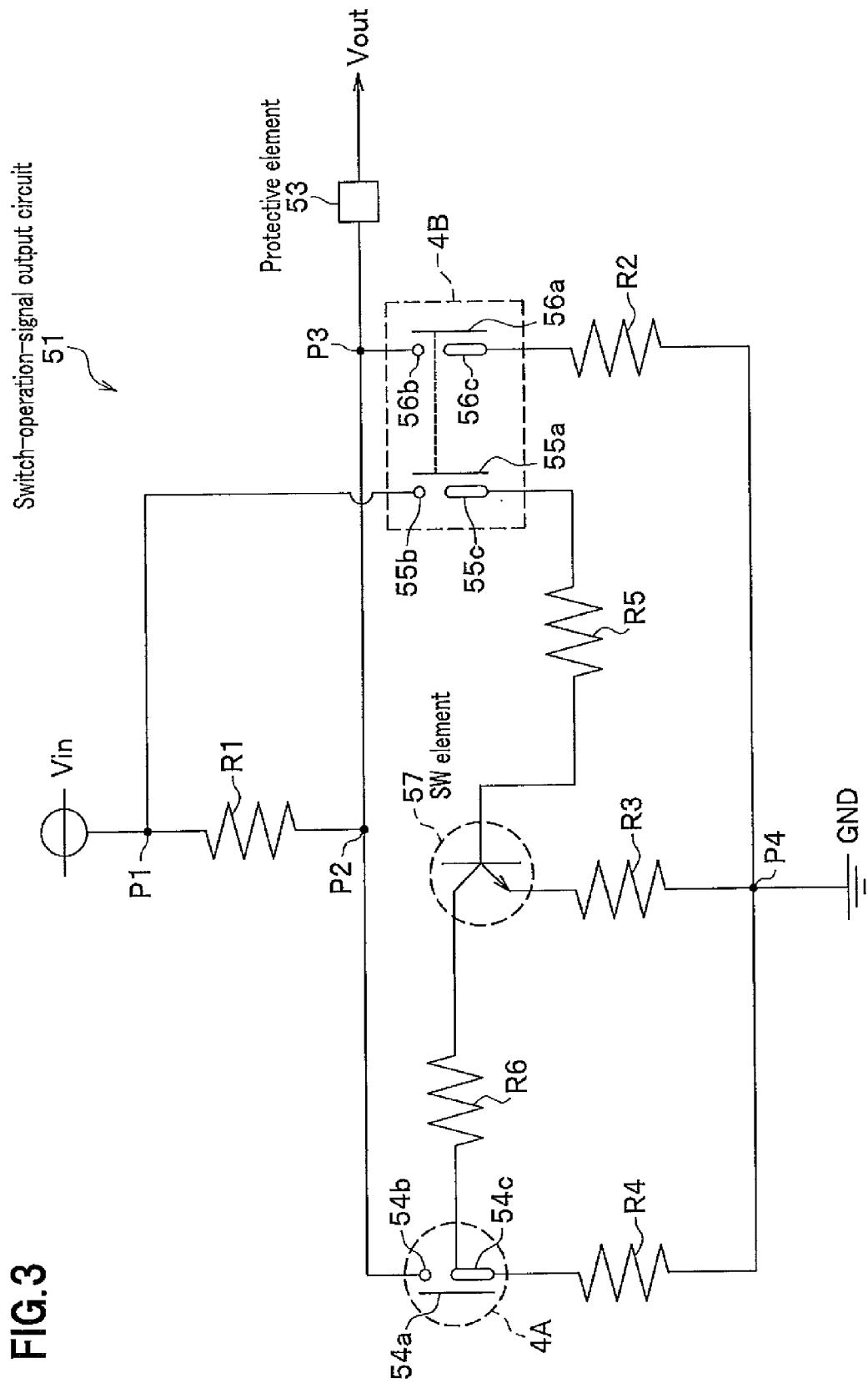
FIG. 3 is an explanatory diagram of a switch-operation-signal output circuit in FIG. 1.

Next, with reference to FIGS. 3 to 4B, an explanation will be given of a configuration of the switch-operation-signal output circuit 51. FIG. 3 is an explanatory diagram for the switch-operation-signal output circuit in FIG. 1. FIG. 4A is an explanatory diagram for an output voltage by the switch-operation-signal output circuit, and FIG. 4B is an explanatory diagram for an operation of the control device for the automatic transmission corresponding to the output voltage shown in FIG. 4A.

The switch-operation-signal output circuit 51 includes registers R1, R2, R3, R4, R5 and R6, the shift-up SW 4A, the shift-down SW 4B, a switching element 57 (indicated as an "SW element 57" in FIG. 3, and hereinafter referred to as an "SW element 57"), and a protective element 53.

The shift-up SW 4A includes a movable piece 54a, and fixed contacts 54b and 54c that are connected/disconnected to/from the movable piece 54a. The shift-down SW 4B is a coupled dual switch, and includes a movable piece 55a, fixed contacts 55b and 55c that are connected/disconnected to/from the movable piece 55a, a movable piece 56a that moves together with the movable piece 55a, and fixed contacts 56b and 56c that are connected/disconnected to/from the movable piece 56a.

The switching element 57 is an NPN transistor switching element, but is not limited to this type.

The upstream-side fixed contact 54b of the shift-up SW 4A is connected to an input voltage Vin at a predetermined constant value through the register R1 at the downstream side of a contact P1 and a contact P2.

The downstream-side fixed contact 54c of the shift-up SW 4A is grounded (indicated as "GND" in FIG. 3) through the register R4 and a contact point P4 at the downstream side thereof. The downstream-side fixed contact 54c of the shift-up SW 4A is further connected to the collector terminal of the SW element 57 through the register R6. The emitter terminal of the SW element 57 is grounded through the register R3 and a contact P4 at the downstream side thereof.

Meanwhile, the predetermined input voltage Vin is not just a battery voltage, but is supplied and set so as not to be largely affected by a fluctuation in the battery voltage by a non-illustrated constant voltage circuit.

The upstream-side fixed contact 55b of the shift-down SW 4B is connected to the input voltage Vin at the predetermined constant value through the contact P1 so that the input voltage Vin is applied to the fixed contact 55b. The downstream-side fixed contact 55c of the shift-down SW 4B is connected to the gate terminal of the SW element 57 through the register R5.

The upstream-side fixed contact 56b of the shift-down SW 4B is connected to the input voltage Vin at the predetermined constant value through the register R1 and a wiring that interconnects the contact P2 and a contact P3. The downstream-side fixed contact 56c of the shift-down SW 4B is grounded through the register R2 and a contact P4 at the downstream side thereof.

A voltage between GND and the contact P3 is input into the microcomputer 52 (see FIG. 1) as an output voltage Vout by the switch-operation-signal output circuit 51 through the protective element 53 like a barrister.

Respective resistances of the registers R1 to R6 are set so that the values of the output voltage Vout become Vin, V1, V2, and V3, respectively, shown in FIG. 4A. In particular, regarding the resistance of the register R1, it is for controlling a current with respect to the output voltage Vout when both shift-up SW 4A and shift-down SW 4B are in an off-state. Moreover, the resistance of the register R1 is also set as a voltage dividing register relative to the registers R2 to R6 depending on the on-state of the shift-up SW 4A and the shift-down SW 4B.

After respective resistances of the registers R1 to R6 are set, as shown in FIG. 4B, the value of the output voltage Vout when both shift-up SW 4A and shift-down SW 4B are in an off-state becomes equal to Vin (a first output voltage). When the driver operates no shift-up SW 4A and shift-down SW 4B and when the shift-up SW 4A and the shift-down SW 4B are in a normal condition, both switches are in an off-state so that the value of the output voltage becomes equal to Vin.

When the shift-up SW 4A is in an on-state and the shift-down SW 4B is in an off-state, the output voltage Vout becomes V1 (a second output voltage) which is a divided voltage by the register R4 with respect to a current flowing through the registers R1 and R4 in series. For example, it stands at a value of substantially ¾ times as much as Vin. When detecting the output voltage of this value, if it is in the manual mode, the microcomputer 52 can determine that an operation signal for shift-up is input therein from the switch-operation-signal output circuit 51. However, also in the case of an on-state defect in which the movable piece 54a is fixed to the fixed contacts 54b and 54c and is unseparable therefrom, such an output voltage Vout may be falsely output.

When the shift-up SW 4A is in an off-state and the shift-down SW 4B is in an on-state, the value of the output voltage Vout becomes V2 (a third output voltage) which is a divided voltage by the register R2 with respect to a current flowing through the registers R1 and R2 in series. For example, it stands at a value of substantially ½ times as much as Vin. When detecting the output voltage of this value, if it is in the manual mode, the microcomputer 52 can determine that an operation signal for shift-down is input therein from the switch-operation-signal output circuit 51. However, also in the case of an on-state defect in which the movable piece 56a is fixed to the fixed contacts 56b and 56c and is unseparable therefrom, such an output voltage Vout may be falsely output.

When the shift-up SW 4A is in an on-state and the shift-down SW 4B is also in an on-state, a current flows at the downstream side of the register R1 to the ground side through three parallel circuits. That is, parallel currents flow through the register R2, the register R4, and a pathway through the register R6, the SW element 57, and the register R3. Accordingly, the value of the output voltage Vout becomes V3 (a fourth output voltage) which is a divided voltage generated by three parallel currents at the downstream side of the register R1. For example, it stands at a value of substantially ¼ times as much as Vin. When detecting the output voltage of this value, the microcomputer 52 can determine that an operation signal for a mode change (setting of the manual mode) from the automatic mode to the manual mode or a mode change (canceling of the manual mode) from the manual mode to the automatic mode is input therein from the switch-operation-signal output circuit 51. However, when the shift-up SW 4A is in an on-state defect condition, if the shift-down SW 4B is operated (turned on) or conversely, when the shift-down SW 4B is in an on-state defect condition, if the shift-up SW 4A is operated, such an output voltage Vout with a value that is V3 may be falsely output. Accordingly, as will be discussed later in detail, the manual mode is set or canceled upon checking of whether or not the shift-up SW 4A and the shift-down SW 4B are not in an on-state defect condition.

When the value of the output voltage Vout is the GND level, the microcomputer 52 determines that a supply line of the predetermined constant voltage that is supplied as Vin is disconnected in the halfway thereof or a signal line for inputting the output voltage Vout into the microcomputer 52 is disconnected in the halfway thereof.

In order to prevent a so-called second-gear start or a higher gear like a third-gear start other than a case in which the vehicle is stopping (the vehicle speed signal from the vehicle speed sensor 7 is "0 km/h"), the microcomputer 52 sets the gear to be the first gear in the manual mode even if both shift-up SW 4A and shift-down SW 4B are substantially simultaneously operated.

Next, with reference to FIGS. 5 to 14 and FIGS. 1 to 3 as needed, an explanation will be given of a control by the microcomputer 52 of the control device 5 for the automatic transmission 2 according to this embodiment.

Figure 5:
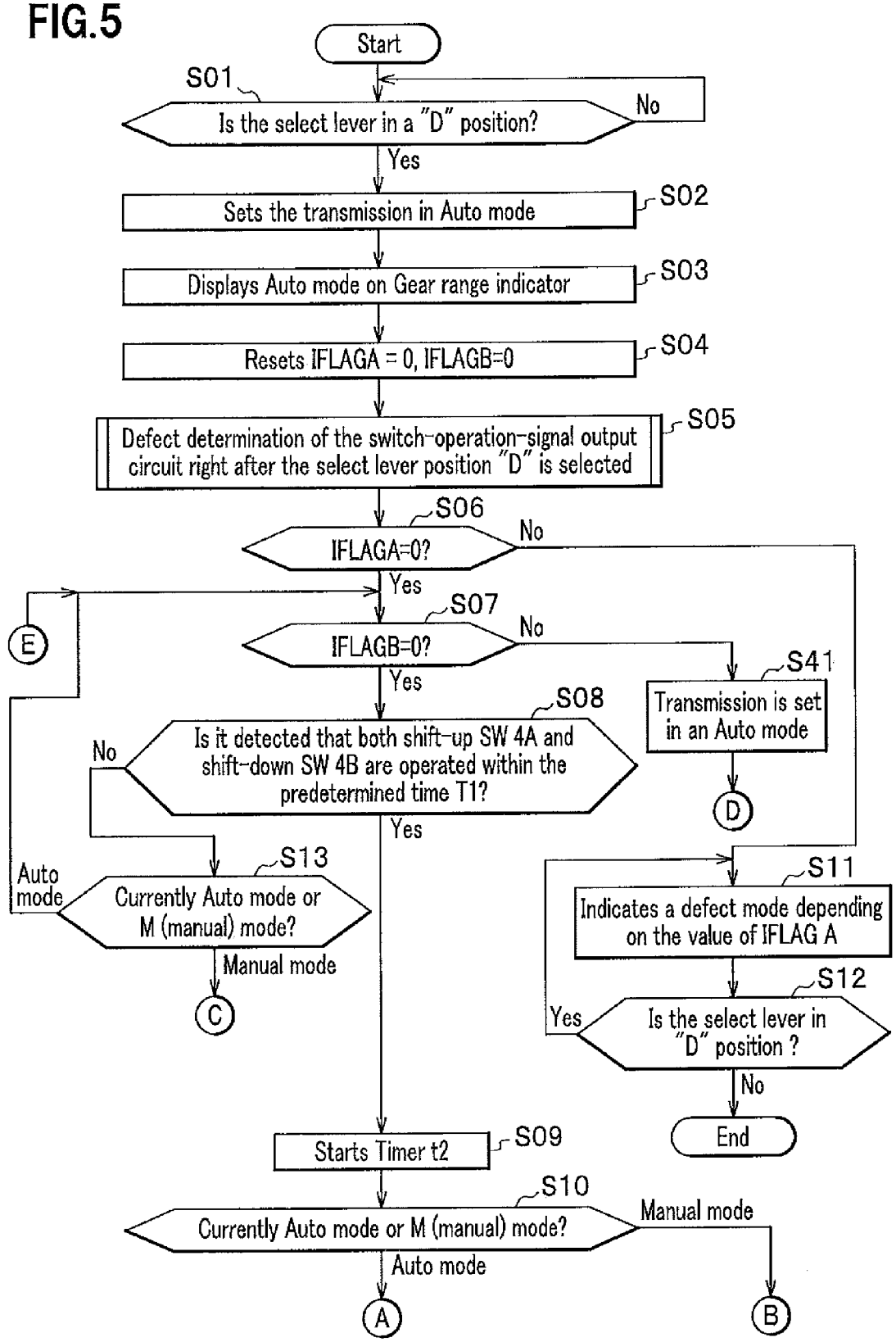
FIG. 5 is a flowchart showing a whole flow of a control of changing the mode of the automatic transmission between an automatic mode and a manual mode by the automatic-transmission control device.
Figure 6:
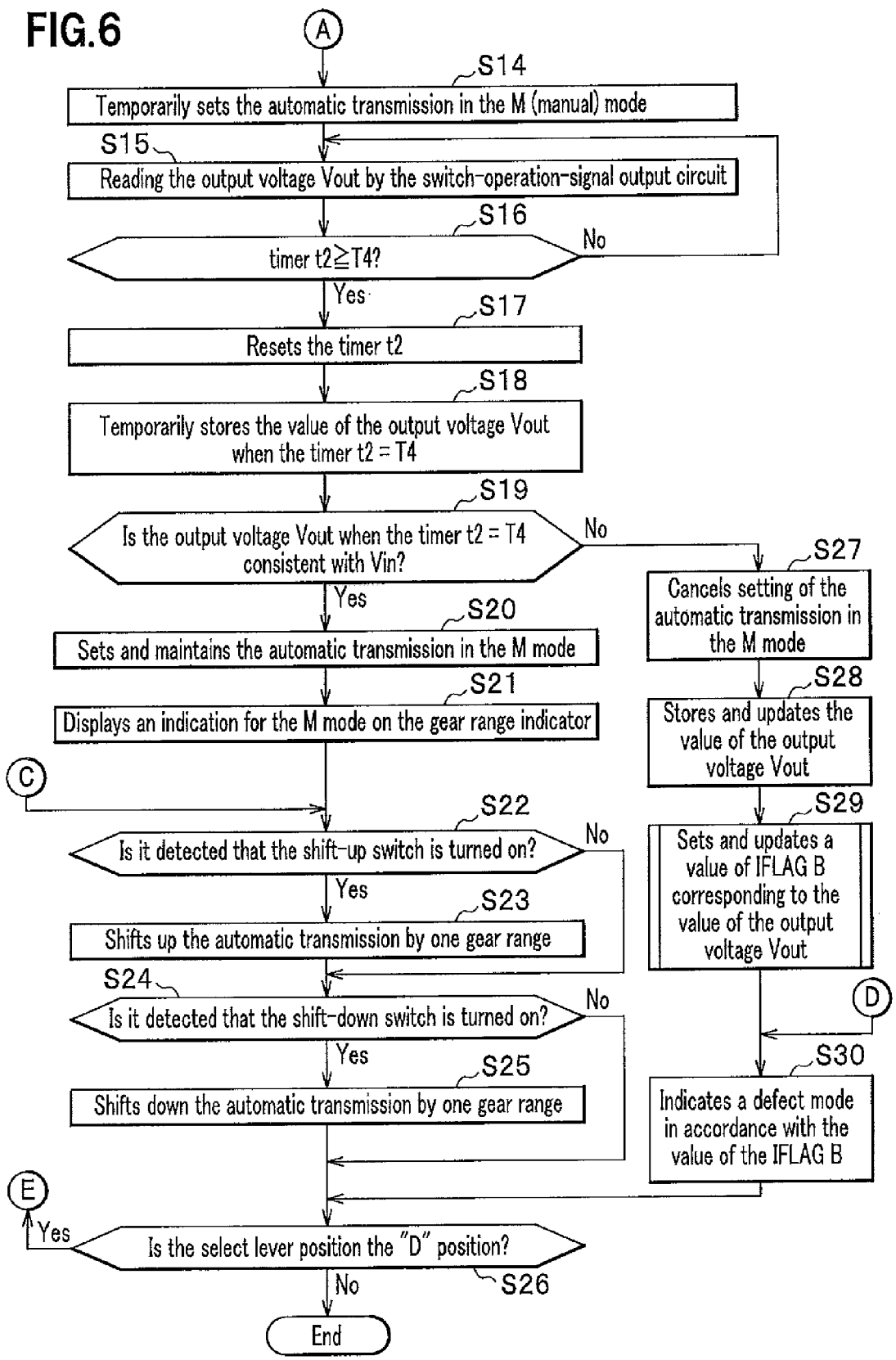
FIG. 6 is a flowchart showing a whole flow of a control of changing the mode of the automatic transmission between an automatic mode and a manual mode by the automatic-transmission control device.
Figure 7:
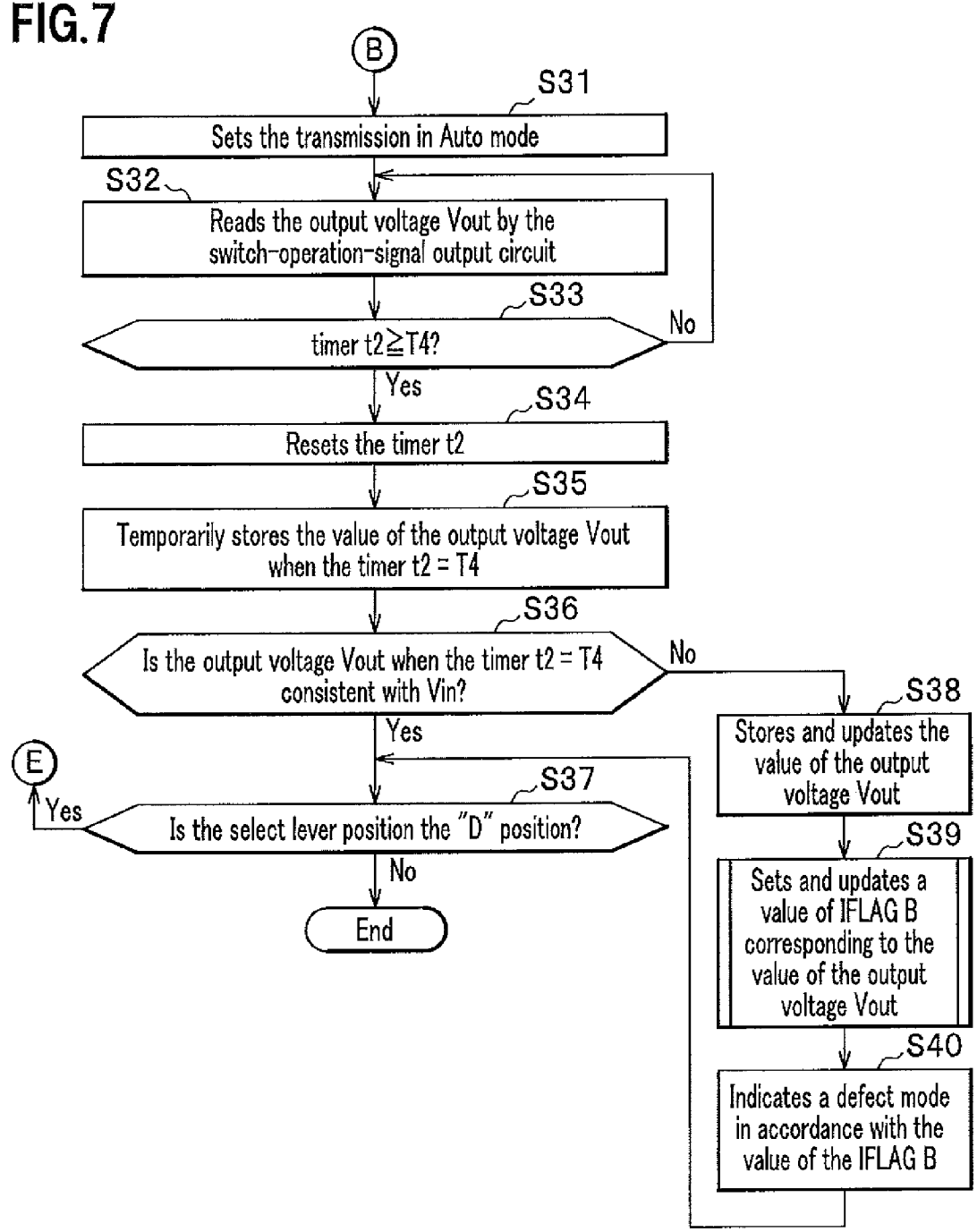
FIG. 7 is a flowchart showing a whole flow of a control of changing the mode of the automatic transmission between an automatic mode and a manual mode by the automatic-transmission control device.

FIGS. 5 to 7 are flowcharts each showing a whole flow of a control of a mode change by the control device for the automatic transmission between the automatic mode and the manual mode.

Figure 8:
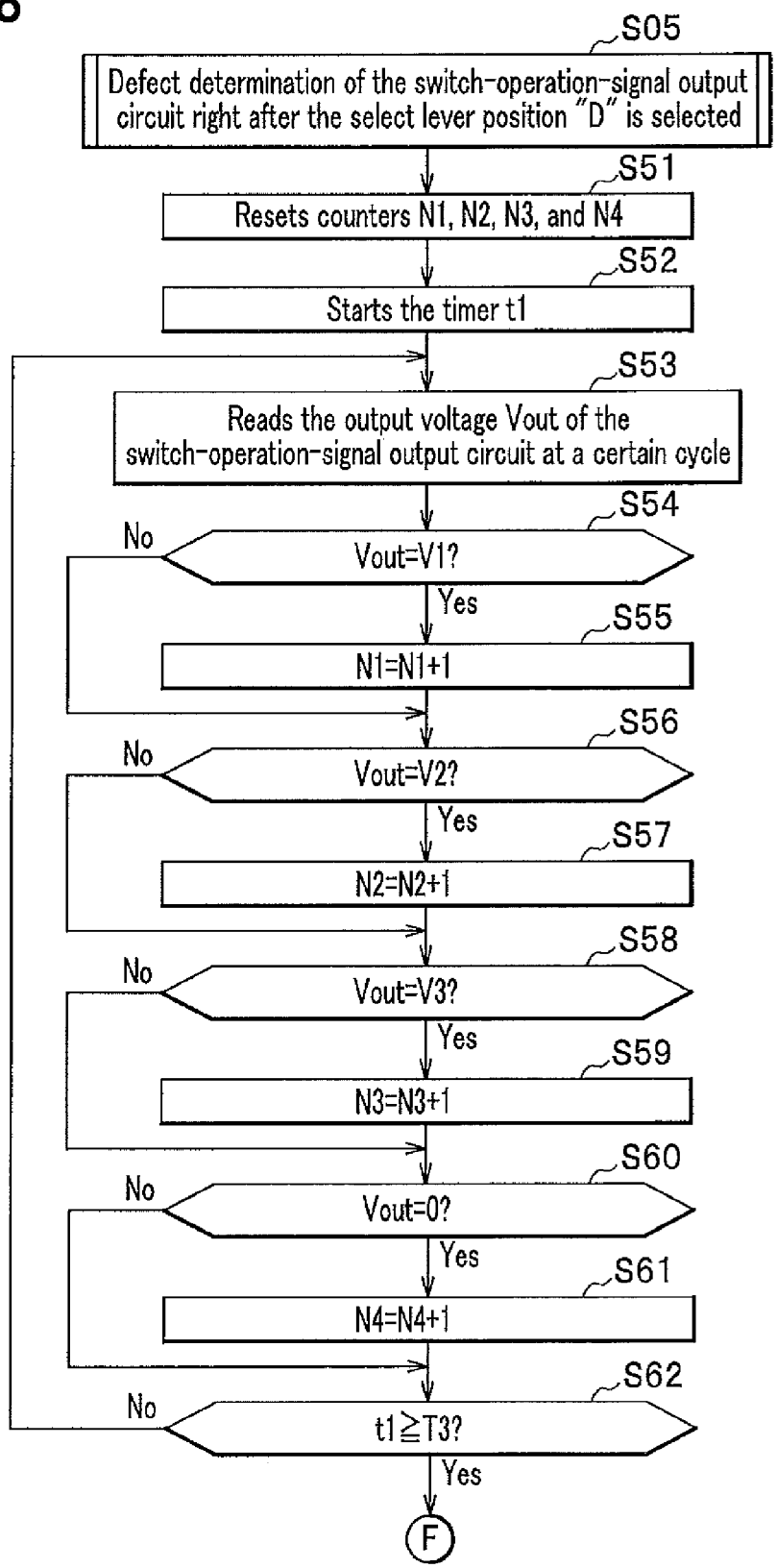
FIG. 8 is a flowchart showing a detailed flow of a control of a defect determination for the switch-operation-signal output circuit right after a select lever position "D" is selected.
Figure 9:
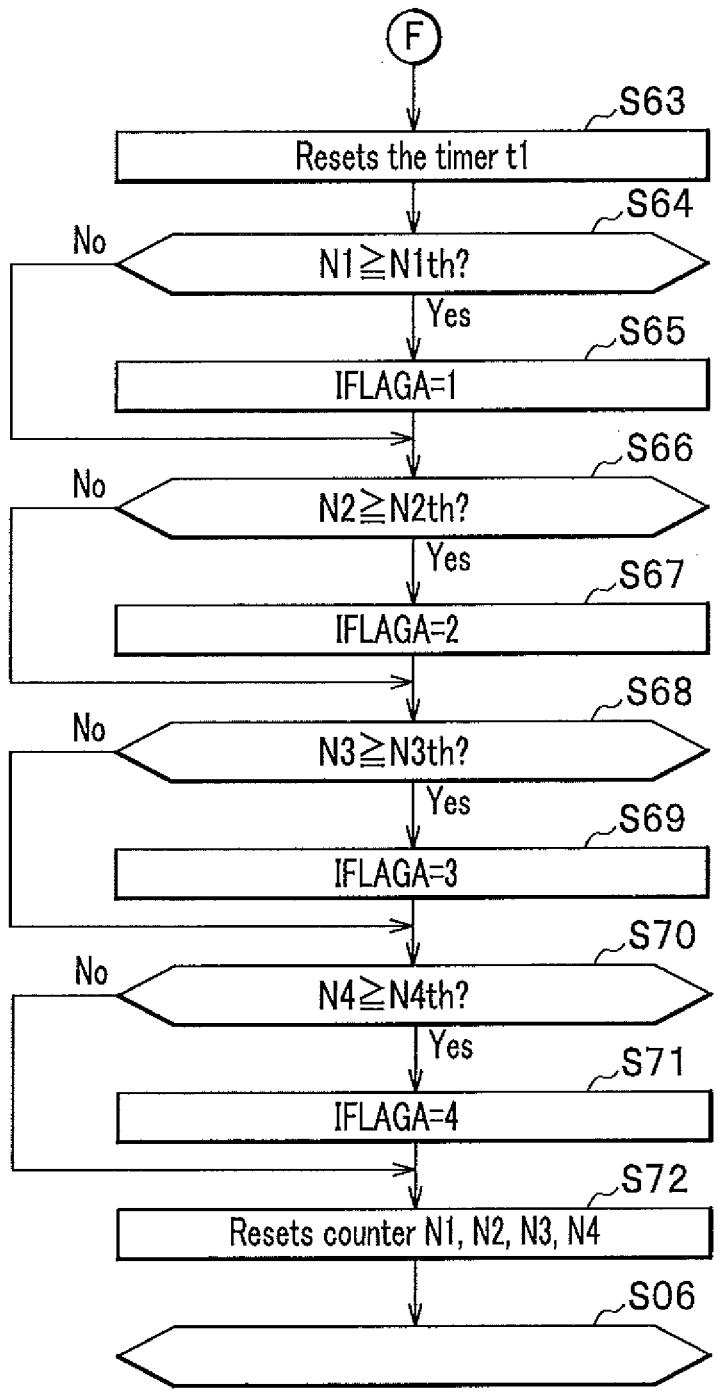
FIG. 9 is a flowchart showing a detailed flow of a control of a defect determination for the switch-operation-signal output circuit right after a select lever position "D" is selected.
Figure 10:
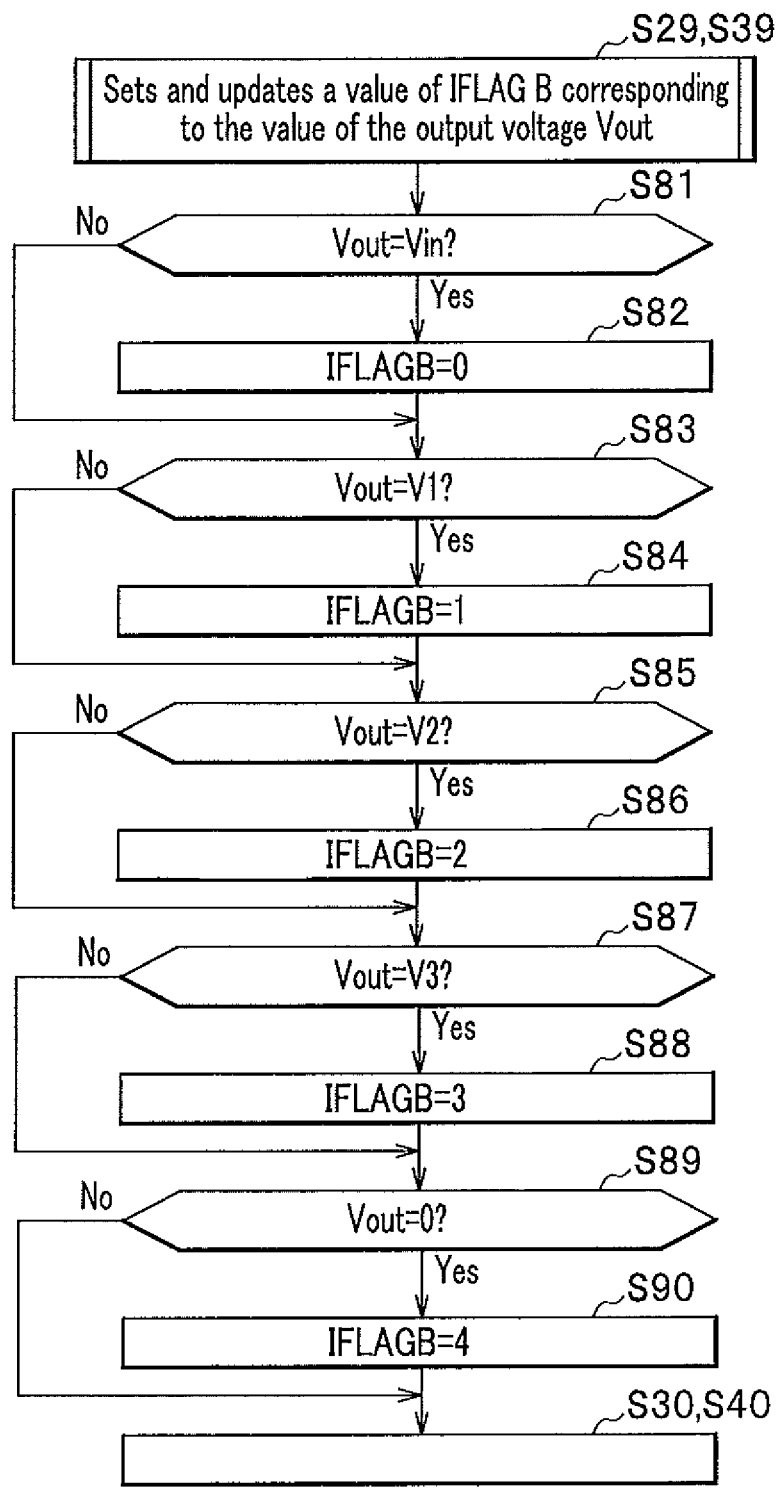
FIG. 10 is a flowchart showing a detailed flow of a control of the defect determination for the switch-operation-signal output circuit and of a monitoring of an output voltage after a shift-up SW and a shift-down SW are operated within a predetermined first threshold time and further after a third threshold time elapses.

FIGS. 8 and 9 are flowcharts each showing a detailed flow of a control of a defect determination of the switch-operation-signal output circuit right after the select lever position "D" is selected. FIG. 10 is a flowchart showing a detailed flow of a control of the defect determination for the switch-operation-signal output circuit and of a monitoring of an output voltage after the shift-up SW and the shift-down SW are operated within a predetermined first threshold time and further after a third threshold time elapses.

Figure 11A:
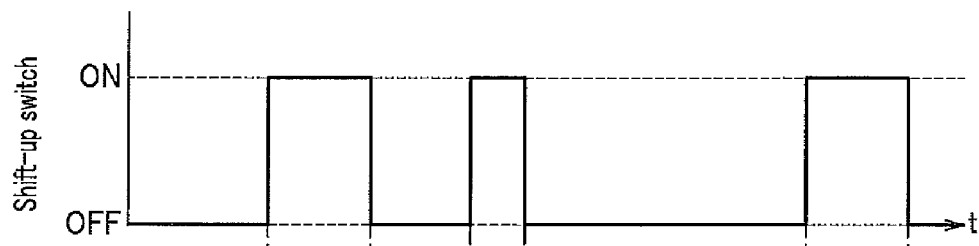
FIGS. 11A to 11C are explanatory diagrams for how to change the control state of the automatic transmission through an operation given to the shift-up SW and the shift-down SW.
Figure 11B:
Figure 11C:
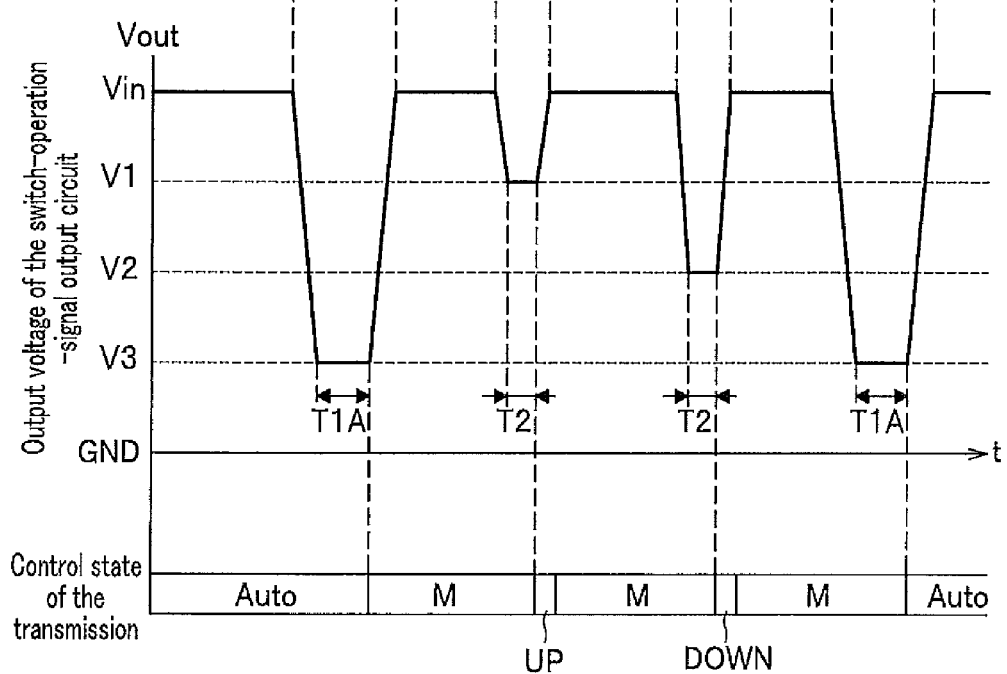
Figure 12A:
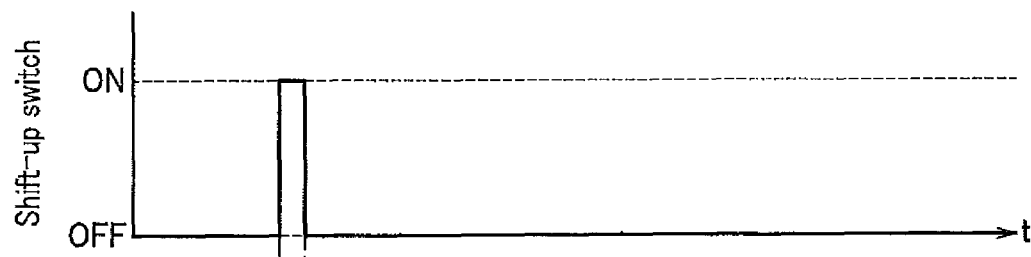
FIGS. 12A to 12C are explanatory diagrams for another determination method of a mode change between the automatic mode and the manual mode through an operation given to the shift-up SW and the shift-down SW.
Figure 12B:
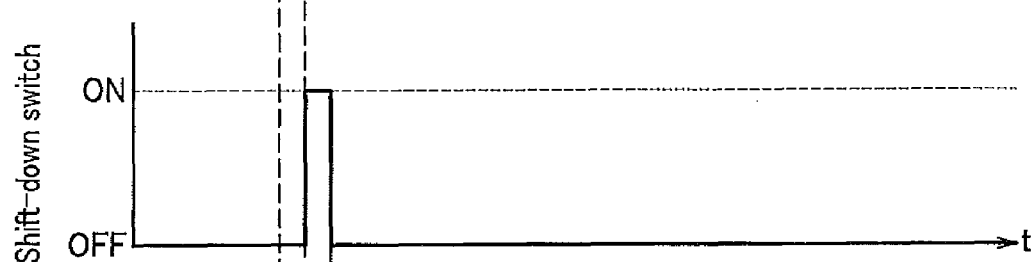
Figure 12C:
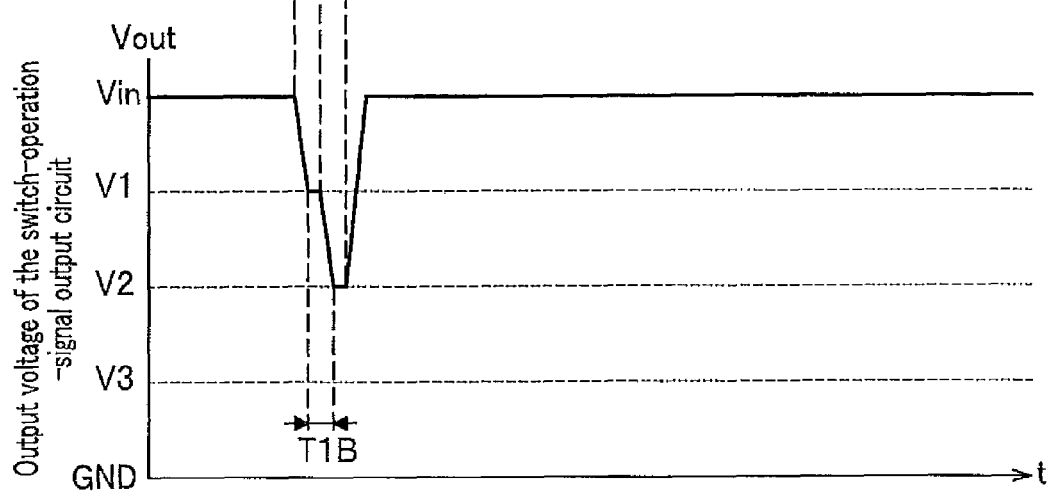
Figure 13A:
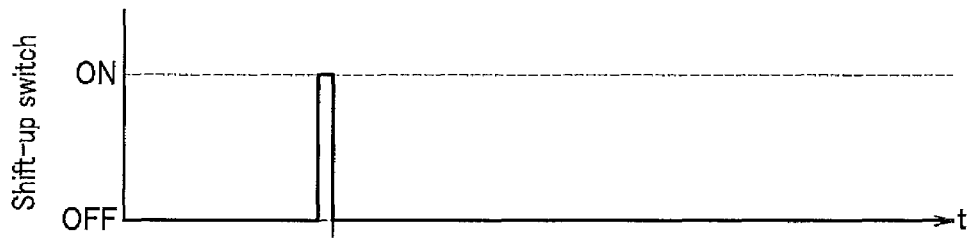
FIGS. 13A to 13C are explanatory diagrams for the other determination method of a mode change between the automatic mode and the manual mode through an operation given to the shift-up SW and the shift-down SW.
Figure 13B:
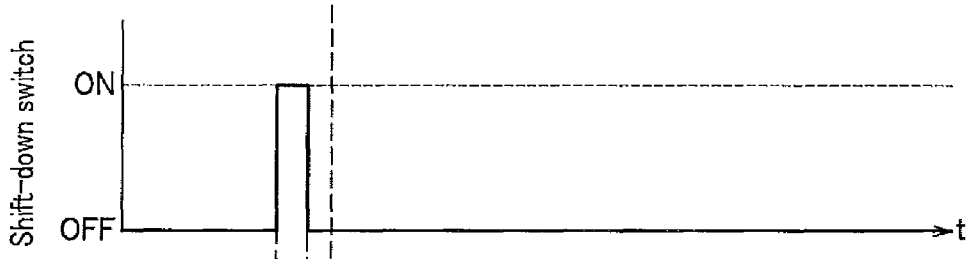
Figure 13C:
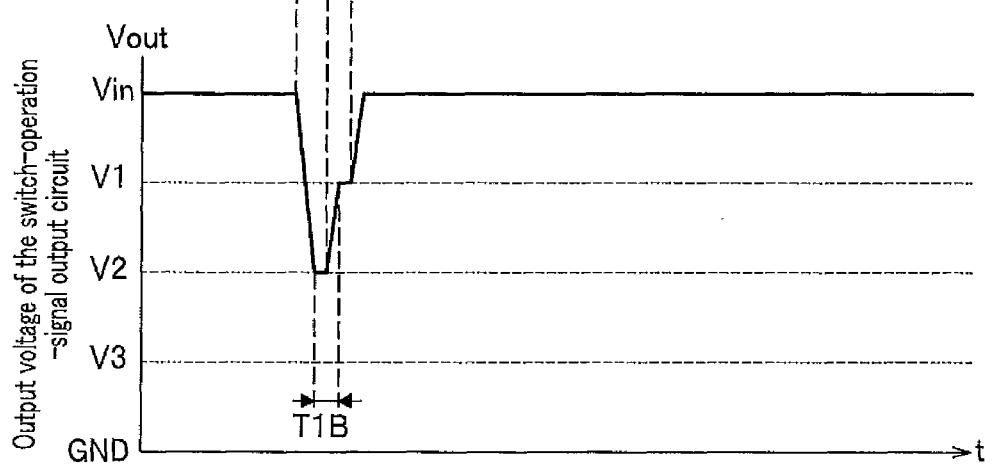
Figure 14A:
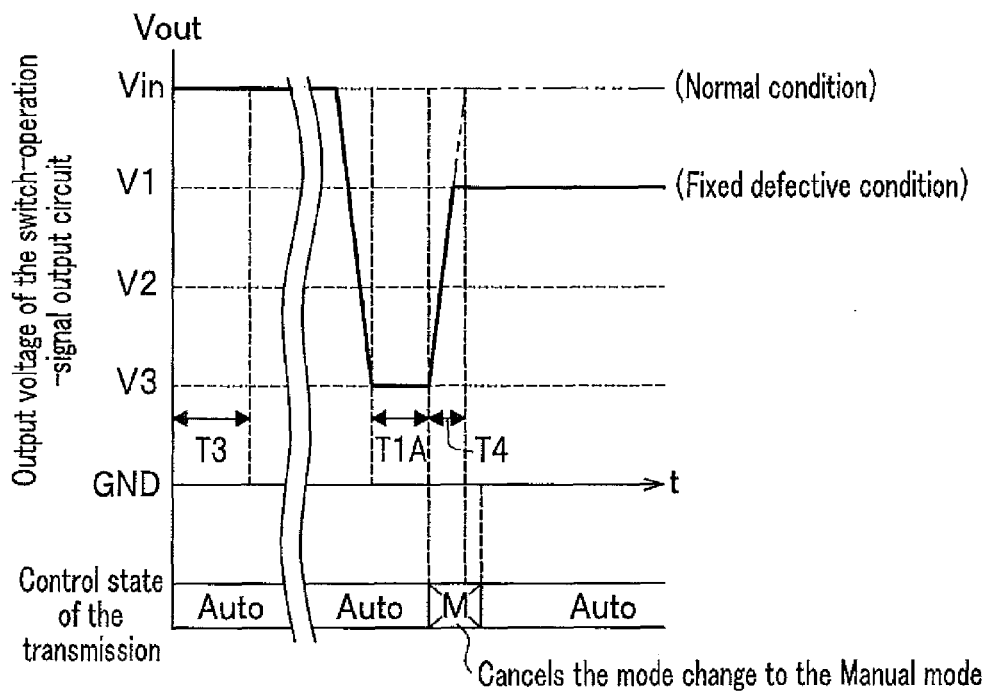
FIGS. 14A and 14B are explanatory diagrams for a mode change determination from the automatic mode to the manual mode through an operation to the shift-up SW and the shift-down SW.
Figure 14B:
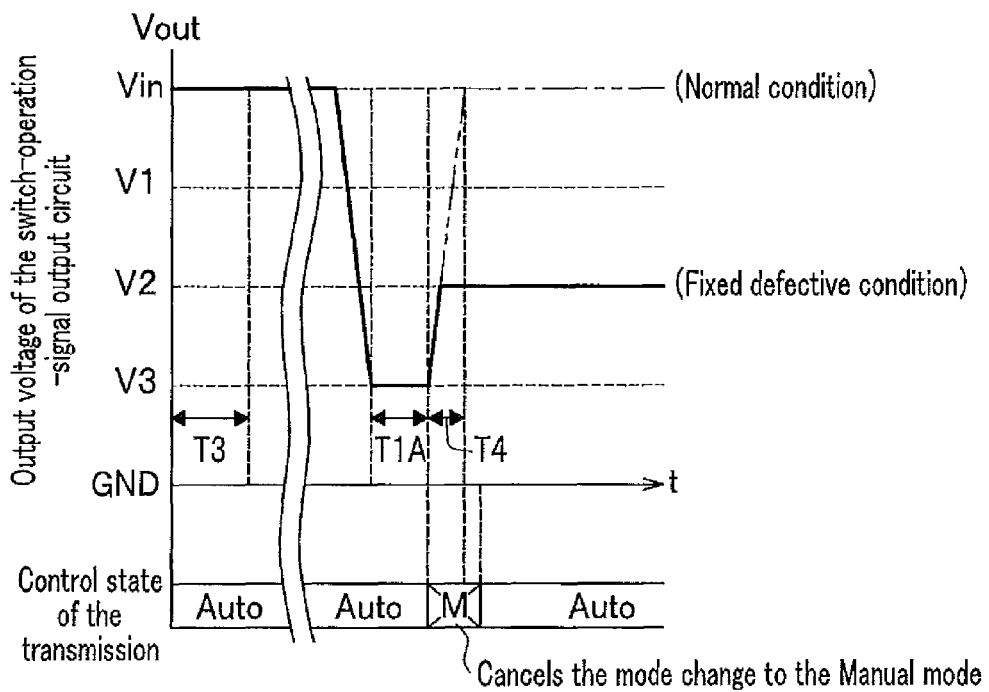

FIGS. 11A to 11C are explanatory diagrams for how to change the control state of the automatic transmission through an operation given to the shift-up SW and the shift-down SW, and FIG. 11A is a time chart of an operation to the shift-up SW, FIG. 11B is a time chart of an operation to the shift-down SW, and FIG. 11C is an explanatory diagram for a change in an output voltage by the switch-operation-signal output circuit and the control state of the automatic transmission. FIGS. 12A to 12C are explanatory diagrams for another determination method of a mode change between the automatic mode and the manual mode through an operation given to the shift-up SW and the shift-down SW, and FIG. 12A is a time chart of an operation to the shift-up SW, FIG. 12B is a time chart of an operation to the shift-down SW, and FIG. 12C is an explanatory diagram for a change in an output voltage by the switch-operation-signal output circuit for a mode change determination between the automatic mode and the manual mode. FIGS. 13A to 13C are explanatory diagrams for the other determination method of a mode change between the automatic mode and the manual mode through an operation given to the shift-up SW and the shift-down SW, and FIG. 13A is a time chart of an operation to the shift-up SW, FIG. 13B is a time chart of an operation to the shift-down SW, and FIG. 13C is an explanatory diagram for a change in an output voltage by the switch-operation-signal output circuit for a mode change determination between the automatic mode and the manual mode. FIGS. 14A and 14B are explanatory diagrams for a mode change determination from the automatic mode to the manual mode through an operation to the shift-up SW and the shift-down SW, and FIG. 14A is an explanatory diagram for a mode change termination to the manual mode when the shift-up SW is in a defective condition in which it is fixed in an on-state, and FIG. 14B is an explanatory diagram for a mode change termination to the manual mode when the shift-down SW is in a defective condition in which it is fixed in an on-state.

It is presumed that when the engine is started and the select lever 34 (see FIG. 2) is put in the "D" position, the mode of the automatic transmission 2 automatically becomes the automatic mode. Hereinafter, the automatic mode will be abbreviated as an "Auto mode", and the manual mode will be abbreviated as an "M mode". Also, in FIGS. 5 to 7, the automatic transmission 2 is simply indicated as a "transmission".

In step S01, it is checked whether or not the select lever position is the "D" position based on a select signal from the select position SW 36 (see FIG. 1). When the select lever position is the "D" position (step S01: YES), the process progresses to step S02, and when the select lever position is not the "D" position (step S01: NO), the process returns to the step S01.

In the step S02, the automatic transmission 2 is set to be in the Auto mode. In step S03, an indication like "A1" of the Auto mode is indicated in the gear range indicator window 9b of the gear range indicator 9. Note that "A" means the Auto mode and "1" means a first gear.

In step S04, IFLAG A and IFLAG B are reset so that IFLAG A=0 and IFLAG B=0. IFLAG A indicates a defect determination result of the switch-operation-signal output circuit 51 (see FIG. 1) in a predetermined time range that is a time T3 (a predetermined second threshold time) right after the select lever 34 (see FIG. 2) is set to the "D" position. IFLAG A=0 indicates a normal condition, IFLAG A=1 indicates a fixed defective condition of the shift-up SW 4A (see FIG. 3), IFLAG A=2 indicates a fixed defective condition of the shift-down SW 4B (see FIG. 3), IFLAG A=3 indicates the fixed defective condition of both shift-up SW 4A and shift-down SW 4B, and IFLAG A=4 indicates a disconnection defect.

Note that the predetermined time T3 is longer than a predetermined time (a predetermined first threshold time) T1

(corresponding to a predetermined time T1A in FIG. 11 or a predetermined time T1B in FIGS. 12 and 13) to be discussed later.

IFLAG B indicates a defect determination result of the switch-operation-signal output circuit 51 based on the output voltage Vout by the switch-operation-signal output circuit 51 at a time point at which a predetermined time T4 (a predetermined third threshold time) has elapsed after the microcomputer 52 determines that the shift-up SW 4A and the shift-down SW 4B are substantially simultaneously turned on (operated within the predetermined first threshold time). IFLAG B=0 indicates a normal condition, IFLAG B=1 indicates the fixed defective condition of the shift-up SW 4A, IFLAG B=2 indicates the fixed defective condition of the shift-down SW 4B, IFLAG B=3 indicates the fixed defective condition of both shift-up SW 4A and shift-down SW 4B, and IFLAG B=4 indicates a disconnection defect.

In step S05, the defect of the switch-operation-signal output circuit 51 right after the driver selects the "D" position of the select lever 34 is determined. (a defect determination of the switch-operation-signal output circuit right after the select lever position "D" is selected) The detail of the step S05 will be discussed later in the explanation of the detailed flowchart of FIG. 8.

In step S06, the defect determination result in the step S05, i.e., whether or not the switch-operation-signal output circuit 51 is normal, that is, whether or not IFLAG A is zero is checked. When IFLAG A=0 (step S06: YES), the process progresses to step S07, and when the IFLAG A is not zero (step S06: NO), the process progresses to step S11.

In the step S11, a defect mode corresponding to the value of IFLAG A is indicated. An indication is given to the effect that the shift-up SW 4A (see FIG. 3) is in a fixed defective condition when IFLAG A=1, the shift-down SW 4B (see FIG. 3) is in a fixed defective condition when IFLAG A=2, both shift-up SW 4A and shift-down SW 4B are in a fixed defective condition when IFLAG A=3, and it is a disconnection defect when IFLAG A=4.

Regarding the indication of the defect condition, for example, an error code is displayed at the further right of the indication to the effect that the automatic transmission 2 is currently in the Auto mode and the indication of the current gear range both in the gear range indicator window 9b. For example, an indication "A4" is displayed in the Auto mode and in the fourth gear state, and this indication is further combined with, for example, an indication "Error: A1" that indicates IFLAG A=1, so that an indication "A4, Error: A1" is displayed. "A1" in the indication "Error: A1" means that IFLAG A=1.

In step S12, it is checked whether or not the select lever position is the "D" position. When the select lever position is the "D" position (step S12: YES), the process returns to the step S11, and the automatic transmission 2 is maintained in the Auto mode set in the step S02. When the select lever position is not the "D" position (step S12: NO), the successive control by the control device 5 to the automatic transmission 2 is terminated.

When the process progresses to the step S07 from the step S06 (step S06: YES), it is checked whether or not IFLAG B=0. When IFLAG B=0 (step S07: YES), the process progresses to step S08, and when IFLAG B is not zero (step S07: NO), the process progresses to step S41.

Since IFLAG B is reset to be zero in the step S04, the process progresses to step S08 at first.

In the step S08, it is checked whether or not the microcomputer 52 detects that both shift-up SW 4A and shift-down SW 4B are operated within the predetermined time T1.

The condition in which "the microcomputer detects that both shift-up SW 4A and shift-down SW 4B are operated within the predetermined time T1 (the predetermined first threshold time)" includes a case in which both shift-up SW 4A and shift-down SW 4B are substantially simultaneously operated as shown in FIGS. 11A and 11B, and the microcomputer 52 detects that the output voltage Vout by the switch-operation-signal output circuit 51 indicates the value V3 for a time equal to or longer than the predetermined time T1A (the predetermined first threshold time), but also includes the following two cases.

As shown in FIGS. 12A and 12B, when the shift-up SW 4A is turned on, and the shift-down SW 4B is immediately turned on, so that the output voltage Vout by the switch-operation-signal output circuit 51 indicates the value V2 within the predetermined time T1B (the predetermined first threshold time) after such an output voltage becomes V1 as shown in FIG. 11C, such a case also corresponds to the condition in which "the microcomputer 52 detects that both shift-up SW 4A and shift-down SW 4B are operated within the predetermined time T1".

Also, as shown in FIGS. 13A and 13B, when the shift-down SW 4B is turned on, and the shift-up SW 4A is immediately turned on, so that the output voltage Vout by the switch-operation-signal output circuit 51 indicates the value V1 within the predetermined time T1B (the predetermined first threshold time) after such an output voltage becomes V2 as shown in FIG. 11C, such a case also corresponds to the condition in which "the microcomputer 52 detects that both shift-up SW 4A and shift-down SW 4B are operated within the predetermined time T1".

The predetermined times T1A and T1B are set to be shorter than the predetermined time T3.

When the determination result is YES in the step S08 (step S08: YES), the process progresses to step S09, and when the determination result is NO (step S08: NO), the process progresses to step S13.

In the step S09, a timer t2 is activated, and in step S10, it is checked whether the current mode is the Auto mode or the M mode. When it is in the Auto mode, the process progresses to step S14 in FIG. 6 through a node A, and when it is in the M mode, the process progresses to step S31 in FIG. 7 through a node B.

When the determination result is NO in the step S08 and the process progresses to the step S13, it is checked whether the current mode is the Auto mode or the M (manual) mode. When it is in the Auto mode, the process returns to the step S07, and when it is in the M (manual) mode, the process progresses to step S22 in FIG. 6 through a node C.

In the step S07, when the value of IFLAG B is updated and set to a value other than zero in step S29 or step S39 in a previous repeating process to be discussed later, the determination result becomes NO and the process progresses to step S41, and the mode is set to be the Auto mode when the automatic transmission 2 is not in the Auto mode, and when the automatic transmission 2 is in the Auto mode, such a mode is maintained as it is ("set automatic transmission to Auto mode"). Thereafter, the process progresses to step S30 in FIG. 6 through a node D.

In the step S14, the automatic transmission 2 is temporarily set to be in the M (manual) mode. In step S15, the output voltage Vout by the switch-operation-signal output circuit 51 is read. In step S16, it is checked whether or not the time counted by the timer t2 has elapsed a predetermined time T4. When the counted time by the timer t2 has elapsed the predetermined time T4 (step S16: YES), the process progresses to step S17, and when the counted time by the timer t2 has not elapsed the predetermined time T4 (step S16: NO), the process repeats the steps S15 and S16.

In the step S17, the timer t2 is reset, and in step S18, the value of the output voltage Vout read at last in the step S15, i.e., the value of the output voltage Vout when the timer t2=T4 is temporarily stored.

As shown in FIGS. 14A and 14B, the predetermined time T4 is set in consideration of a delay (the time constant of the switch-operation-signal output circuit 51) necessary for the output voltage Vout to return to the level of Vin from the level of V3 after the microcomputer 52 detects in the step S08 that both shift-up SW 4A and shift-down SW 4B are operated within the predetermined time T1 (indicated as T1A in FIGS. 14A and 14B) if the switch-operation-signal output circuit 51 is originally in a normal condition.

In step S19, it is checked whether or not the output voltage Vout by the switch-operation-signal output circuit 51 when the timer t2=T4 is consistent with Vin. When the output voltage Vout is consistent with Vin (step S19: YES), the process progresses to step S20, and when such an output voltage is not consistent with Vin (step S19: NO), the process progresses to step S27.

In the step S20, the automatic transmission 2 is set and maintained in the M mode. Next, in step S21, an indication for the M mode is displayed on the gear range indicator window 9b of the gear range display unit 9. For example, like an indication "M3", "M" that indicates the M mode and "3" indicating that the gear range is the third gear are displayed.

After the step S21, the process progresses to step S22, and when the automatic transmission 2 is set to be in the M mode in the step S13, the process also progresses to the step S22.

In the step S22, it is checked whether or not turning on (an on-operation) of the shift-up SW 4A is detected. When the value of the output voltage Vout by the switch-operation-signal output circuit 51 is V1, it corresponds to a case in which the turning on (the on-operation) of the shift-up SW 4A is detected. When the turning on (the on-operation) of the shift-up SW 4A is detected (step S22: YES), the process progresses to step S23, and when such an operation is not detected (step S22: NO), the process progresses to step S24.

In the step S23, the automatic transmission 2 is shifted up by one gear range.

Regarding a control for this one-gear-range shift-up of the automatic transmission 2, even if the value of the output voltage Vout by the switch-operation-signal output circuit 51 is continuously V1 in terms of time, only once shift-up operation of one gear range is permitted.

In the step S24, it is checked whether or not turning on (an on-operation) of the shift-down SW 4B is detected. When the value of the output voltage Vout by the switch-operation-signal output circuit 51 is V2, it corresponds to a case in which the turning on (the on-operation) of the shift-down SW 4B is detected. When the turning on (the on-operation) of the shift-down SW 4B is detected (step S24: YES), the process progresses to step S25, and when such an operation is not detected (step S24: NO), the process progresses to step S26.

In the step S25, the automatic transmission 2 is shifted down by one gear range.

Regarding a control for this one-gear-range shift-down of the automatic transmission 2, even if the value of the output voltage Vout by the switch-operation-signal output circuit 51 is continuously V2 in terms of time, only once shift-down operation of one gear range is permitted.

In the step S26, it is checked whether or not the select lever position is the "D" position. When the select lever position is the "D" position (step S26: YES), the process returns to the step S07 through a node E, and when the select lever position is not the "D" position (step S26: NO), the successive control for the automatic transmission 2 by the control device 5 is terminated.

When the determination result in the step S19 is NO and the process progresses to the step S27, setting of the automatic transmission 2 to be in the M mode is cancelled. In step S28, the value of the output voltage Vout temporarily stored in the step S18 is actually stored and updated ("store and update value of output voltage Vout"). Thereafter, when the process progresses to step S29, a value of IFLAG B corresponding to the value of the output voltage Vout is set and updated.

The detail of the step S29 will be explained later in the flowchart of FIG. 10.

When the process progresses from the step S29 to step S30, or when the process progresses to the step S30 through the node D after the step S41 shown in FIG. 5, a defect mode in accordance with the value of the IFLAG B is indicated. When IFLAG B=1, it indicates the fixed defective condition of the shift-up SW 4A (see FIG. 3), when IFLAG B=2, it indicates the fixed defective condition of the shift-down SW 4B (see FIG. 3), when IFLAG B=3, it indicates the fixed defective condition of both shift-up SW 4A and shift-down SW 4B, and when IFLAG B=4, it indicates a disconnection defect.

Regarding the display of the defect condition, for example, an error code is displayed at the further right of the indication to the effect that the automatic transmission 2 is currently in the Auto mode and the indication of the current gear range both in the gear range indicator window 9b. For example, an indication "A4" is displayed in the Auto mode and in the fourth gear state, and this indication is further combined with, for example, an indication "Error: B1" that indicates IFLAG B=1, so that an indication "A4, Error: B1" is displayed. "B1" in the indication "Error: B1" means that IFLAG B=1.

After the step S30, the process progresses to the step S26, and it is checked whether or not the select lever position is the "D" position. When the select lever position is the "D" position (step S26: YES), the process returns to the step S07 in FIG. 5 through the node E, and when the select lever position is not the "D" position, the successive control for the automatic transmission 2 by the control device 5 is terminated.

In the step S10 in FIG. 5, when the process progresses to the step S31 in FIG. 7 through the node B in the M mode, the automatic transmission 2 is set to be in the Auto mode. In step S32, the output voltage Vout by the switch-operation-signal output circuit 51 is read. In step S33, it is checked whether or not the counted time by the timer t2 has elapsed the predetermined time T4. When the counted time by the timer t2 has elapsed the predetermined time T4 (step S33: YES), the process progresses to step S34, and when the counted time by the timer t2 has not elapsed the predetermined time T4 (step S33: NO), the process repeats the steps S32 and S33.

In step S34, the timer t2 is reset, and in step S35, the value of the output voltage Vout read at last in the step S32, i.e., the value of the output voltage Vout when the timer t2=T4 is temporarily stored.

In step S36, it is checked whether or not the output voltage Vout by the switch-operation-signal output circuit 51 when the timer t2=T4 is consistent with Vin. When the output voltage Vout is consistent with Vin (step S36: YES), the process progresses to step S37, and when such an output voltage is not consistent with Vin (step S36: NO), the process progresses to step S38.

In the step 38, the value of the output voltage Vout temporarily stored in the step S35 is actually stored ("store and update value of output voltage Vout"). Next, when the process progresses to step S39, the value of the IFLAG B in accordance with the value of the output voltage Vout is set and updated.

The detail of the step S39 will be explained later with reference to the detailed flowchart of FIG. 10.

In step S40, the defect mode in accordance with the IFLAG B is indicated. The detail of the step S40 is same as that of the step S30, so that the duplicated explanation will be omitted.

When the determination result in the step S36 is YES and the process progresses to the step S37, or when the process progresses to the step S37 after the step S40, it is checked whether or not the select lever position is the "D" position. When the select lever position is the "D" position (step S36: YES), the process returns to the step S07 through the node E, and when the select lever position is not the "D" position (step S36: NO), the successive control for the automatic transmission 2 by the control device 5 is terminated.

Next, with reference to FIGS. 8 and 9, an explanation will be given of a detailed flow of the step S05 "defect determination of switch-operation-signal output circuit right after select lever position "D" is selected" in the whole flowchart shown in FIG. 5.

When the process progresses to the step S05, in step S51, counters N1, N2, N3, and N4 are reset. The counters N1 to N4 indicate respective numbers of detection of V1, V2, V3, and 0 as the value of the output voltage Vout when the value of the output voltage Vout is detected plural times at a predetermined short cycle, e.g., a cycle of 100 milliseconds within a time period that a timer t1 to be discussed later is 0 to T3. The value of T3 is, for example, a time of around 1 second.

In step S52, the timer t1 is activated.

In step S53, the output voltage Vout of the switch-operation-signal output circuit 51 is read at a certain cycle of, for example, 100 milliseconds as explained above.

In step S54, it is checked whether or not the output voltage Vout=V1 ("Vout=V1?"). When Vout=V1 (step S54: YES), the process progresses to step S55, the counter N1 is incremented by 1 so that N1=N1+1, and the process progresses to step S56. In the step S54, when Vout is not V1 (step S54: NO), the step S55 is skipped and the process progresses to the step S56.

In the step S56, it is checked whether or not the output voltage Vout=V2 ("Vout=V2?"). When Vout=V2 (step S56: YES), the process progresses to step S57, the counter N2 is incremented by 1 so that N2=N2+1, and the process progresses to step S58. In the step S56, when Vout is not V2 (step S56: NO), the step S57 is skipped and the process progresses to step S58.

In the step S58, it is checked whether or not the output voltage Vout=V3 ("Vout=V3?"). When Vout=V3 (step S58: YES), the process progresses to step S59, the counter N3 is incremented by 1 so that N3=N3+1, and the process progresses to step S60. In the step S58, when Vout is not V3 (step S58: NO), the step S59 is skipped and the process progresses to step S60.

In the step S60, it is checked whether or not the output voltage Vout=0 ("Vout=0?"). When Vout=0 (step S60: YES), the process progresses to step S61, the counter N4 is incremented by 1 so that N4=N4+1, and the process progresses to step S62. In the step S60, when Vout is not 0 (step S60: NO), the step S61 is skipped and the process progresses to step S62.

When the value of the output voltage Vout is a ground level, i.e., a voltage value 0 is indicated as "GND" in FIGS. 11 to 14.

In the step S62, it is checked whether or not the counted time by the timer t1 is equal to or greater than T3. When the counted time by the timer t1 is equal to or greater than T3 (step S62: YES), the process progresses to step S63 in FIG. 9 through the node F, and when the counted time is less than T3 (step S62: NO), the process returns to the step S53.

In the step S63, the timer t1 is reset, and in step S64, it is checked whether or not the value of the counter N1 is equal to or greater than a count-number threshold N1th. When the value of the counter N1 is equal to or greater than the count-number threshold N1th (step S64: YES), the process progresses to step S65, IFLAG A is set to be 1, and the process progresses to step S66. In the step S64, when the value of the counter N1 is less than the count-number threshold N1th (step S64: NO), the step S65 is skipped and the process progresses to step S66.

In the step S66, it is checked whether or not the value of the counter N2 is equal to or greater than a count-number threshold N2th. When the value of the counter N2 is equal to or greater than the count-number threshold N2th (step S66: YES), the process progresses to step S67, IFLAG A is set to be 2, and the process progresses to step S68. In the step S66, when the value of the counter N2 is less than the count-number threshold N2th (step S66: NO), the step S67 is skipped and the process progresses to step S68.

In the step S68, it is checked whether or not the value of the counter N3 is equal to or greater than a count-number threshold N3th. When the value of the counter N3 is equal to or greater than the count-number threshold N3th (step S68: YES), the process progresses to step S69, IFLAG A is set to be 3, and the process progresses to step S70. In the step S68, when the value of the counter N3 is less than the count-number threshold N3th (step S68: NO), the step S69 is skipped and the process progresses to step S70.

In the step S70, it is checked whether or not the value of the counter N4 is equal to or greater than a count-number threshold N4th. When the value of the counter N4 is equal to or greater than the count-number threshold N4th (step S70: YES), the process progresses to step S71, IFLAG A is set to be 4, and the process progresses to step S72. In the step S70, when the value of the counter N4 is less than the count-number threshold N4th (step S70: NO), the step S71 is skipped and the process progresses to step S72.

In the step S72, the counters N1 to N4 are reset, and the process progresses to the step S06 in the whole flowchart of FIG. 5.

It is preferable that respective values of the count-number thresholds N1th, N2th, N3th, and N4th should be selected as a value greater than 1, e.g., an integer equal to or greater than 2 in order to avoid a false defect determination of the switch-operation-signal output circuit 51 due to a false detection of the value of the output voltage Vout originating from noises, etc.

Next, with reference to FIG. 10, an explanation will be given of a detailed flow of the steps S29 and S30 "set and update value of IFLAG B in accordance with value of output voltage Vout" in the whole flowcharts of FIGS. 6 and 7. The detail of the step S29 is same as that of the step S30, so that an explanation will be mainly given of the step S29 as an example.

When the process progresses to the step S29, in step S81, it is checked whether or not the output voltage Vout=Vin ("Vout=Vin?"). When Vout=Vin (step S81: YES), the process progresses to step S82, IFLAG B is set to be 0, and the process further progresses to step S83. In the step S81, when Vout is not Vin (step S81: NO), the step S82 is skipped and the process progresses to the step S83.

In the step S83, it is checked whether or not the output voltage Vout=V1 ("Vout=V1?"). When Vout=V1 (step S83: YES), the process progresses to step S84, IFLAG B is set to be 1, and the process further progresses to step S85. In the step S83, when Vout is not V1 (step S83: NO), the step S84 is skipped and the process progresses to the step S85.

In the step S85, it is checked whether or not the output voltage Vout=V2 ("Vout=V2?"). When Vout=V2 (step S85: YES), the process progresses to step S86, IFLAG B is set to be 2, and the process further progresses to step S87. In the step S85, when Vout is not V2 (step S85: NO), the step S86 is skipped and the process progresses to the step S87.

In the step S87, it is checked whether or not the output voltage Vout=V3 ("Vout=V3?"). When Vout=V3 (step S87: YES), the process progresses to step S88, IFLAG B is set to be 3, and the process further progresses to step S89. In the step S87, when Vout is not V3 (step S87: NO), the step S88 is skipped and the process progresses to the step S89.

In the step S89, it is checked whether or not the output voltage Vout=0 ("Vout=0?"). When Vout=0 (step S89: YES), the process progresses to step S90, IFLAG B is set to be 4, and the process further progresses to step S30 in the whole flowchart. In the step S89, when Vout is not 0 (step S89: NO), the step S90 is skipped and the process progresses to the step S30 in the whole flowchart.

The above-explanation was the detailed flow of the step S29 "set and update value of IFLAG B in accordance with value of output voltage Vout" in the whole flowchart of FIG. 6.

In the case of the detailed flow of the step S39 "set and update value of IFLAG B in accordance with value of output voltage Vout" in FIG. 7, in the explanations in paragraphs 0094 and 0095, the step S29 and the step S30 are read as step S39 and step S40, respectively.

Meanwhile, it is simply expressed as "Vout=V1?", "Vout=V2?", "Vout=V3?", and "Vout=0?" in the steps S54, 56, 58, and 60, respectively, in FIG. 8. Also, it is simply expressed as "Vout=Vin?", "Vout=V1?", "Vout=V2?", "Vout=V3?", and "Vout=0?" in the steps S81, 83, 85, 87, and 89, respectively, in FIG. 10. However, it is natural that the value of the output voltage Vout has a fluctuation range, and in a precise sense, a determination threshold c with a predetermined fluctuation range is set for each of those determinations, and for example, a determination "Vout=V1?" is made based on whether or not an absolute value of a difference between the output voltage Vout and the value V1 set beforehand is smaller than the determination threshold $\epsilon$ (|Vout−V1|<$\epsilon$?). When the absolute value of the difference between the output voltage Vout and the value V1 set beforehand is smaller than the determination threshold c, it is determined that "Vout=V1", and when the absolute value of the difference between the output voltage Vout and the value V1 set beforehand is equal to or greater than the determination threshold c, it is determined that "Vout is not equal to V1". The same is true of the determinations "Vout=V2?", "Vout=V3?", "Vout=0?" and "Vout=Vin?".

The above explanation was for the process of the control of setting/cancelling the manual mode by the microcomputer 52 through the shift-up SW 4A and the shift-down SW 4B.

According to this embodiment, even if either one of the shift-up SW 4A (see FIG. 1) and the shift-down SW 4B (see FIG. 1) provided at the steering wheel 6 (see FIG. 1) is falsely operated like the prior art, it is possible to prevent a setting or cancelling of the M (manual) mode which is not intended by the driver.

Also, since the M mode is not set or cancelled through an operation given to the select lever 34 (see FIG. 2), the M mode can be easily set or cancelled during an operation given to the steering wheel 6 (see FIG. 1).

Furthermore, as is indicated in the steps S05 to S12 in the whole flowchart of FIG. 5, the microcomputer 52 (see FIG. 1) reads and monitors, at a short cycle, the output voltage Vout by the switch-operation-signal output circuit 51 (see FIG. 3) during the predetermined time T3 right after the driver puts the select lever 34 (see FIG. 2) in the "D" position, and when the absolute value of the difference between the output voltage Vout and Vin is less than the predetermined determination threshold c, the microcomputer 52 determines that the output voltage Vout=Vin, and the switch-operation-signal output circuit 51 is in a normal condition.

The value of the output voltage Vout is read during the predetermined time T3 at a short cycle like 100 milliseconds per one second as explained above, and respective numbers of detection of the values V1, V2, V3, and 0 of the output voltage Vout other than Vin are separately counted by the counters N1, N2, N3, and N4.

When respective counted numbers by the counters N1 to N4 are equal to or greater than the count-number thresholds N1th, N2th, N3th, and N4th, determinations are made such that IFLAG A=1 (fixed defect of the shift-up SW 4A), IFLAG A=2 (fixed defect of the shift-down SW 4B), IFLAG A=3 (fixed defect of both shift-up SW 4A and shift-down SW 4B), and IFLAG A=4 (disconnection defect of the switch-operation-signal output circuit 51), respectively, and a mode change from the Auto mode to the M mode is prohibited and thus the automatic transmission 2 is kept to be set in the Auto mode. Also, a result of the defect determination is indicated on the gear range indicator window 9b, and a the driver is notified of the reason why the mode cannot be changed to the M mode.

In this embodiment, every time the select lever 34 is selected to the "D" position, the output voltage Vout is monitored during the predetermined time T3 right after such a selection, so that even if a mode change from the Auto mode to the M mode is prohibited based on a false determination of the value of the output voltage Vout originating from noises due to any temporal external factor, when the select lever 34 is selected to the "D" position at next, a false determination is resolved and a mode change from the Auto mode to the M mode is allowed.

Also, in a case in which the fixed defects of the shift-up SW 4A and the shift-down SW 4B are temporal, if such fixed defects are eliminated by, for example, vibration while the vehicle is running, when the select lever 34 is selected to the "D" position at next, a mode change from the Auto mode to the M mode is allowed.

Accordingly, when a temporal false determination or a temporal fixed defect of the shift-up SW 4A and the shift-down SW 4B is eliminated, and the select lever 34 is newly selected to the "D" position, no mode change from the Auto mode to the M mode is prohibited. Since the driver can determine the cause by checking the error code displayed on the gear range indicator window 9b, the vehicle can be still driven in the Auto mode until the vehicle is inspected at a vehicle maintenance shop at next time even if the error code is frequently displayed, so that the driver is allowed to drive the vehicle without any difficulty in the use of the vehicle.

Also, the microcomputer 52 reads the value of the output voltage Vout of the switch-operation-signal output circuit 51 when the predetermined time T4 has elapsed right after both shift-up SW 4A and shift-down SW 4B are substantially simultaneously turned on, and it is checked whether or not the output voltage Vout of the switch-operation-signal output circuit 51 stands at the value of Vin. Only when the output voltage Vout is Vin, a mode change from the Auto mode to the M mode is permitted and when the output voltage Vout is not Vin, as shown in FIG. 14, such a mode change from the Auto mode to the M mode is cancelled, so that it is convenient for the driver.

FIG. 14A shows a case in which, at a time point at which the driver selects the select lever 34 to the "D" position, the microcomputer 52 detects that the output voltage Vout has the value Vin within the predetermined time T3 and determines that the switch-operation-signal output circuit 51 is in a normal condition. However, the microcomputer 52 thereafter detects that the shift-up SW 4A and shift-down SW 4B are substantially simultaneously operated within the predetermined time T1A, sets the automatic transmission 2 temporarily to be in the M mode, attempts to actually change the mode from the Auto mode to the M mode, but does not detect that the output voltage Vout recovers to the value Vin indicated by a two-point dashed line when the predetermined time T4 has elapsed after it is detected that the shift-up SW 4A and the shift-down SW 4B are substantially simultaneously operated, and detects the value of V1 and determines that the shift-up SW 4A is in a fixed defective condition, thereby cancelling a mode change from the Auto mode to the M mode.

FIG. 14B shows a case in which, at a time point at which the driver selects the select lever 34 to the "D" position, the microcomputer 52 detects that the output voltage Vout has the value Vin within the predetermined time T3, and determines that the switch-operation-signal output circuit 51 is in a normal condition. However, the microcomputer 52 thereafter detects that the shift-up SW 4A and shift-down SW 4B are substantially simultaneously operated within the predetermined time T1A, sets the automatic transmission 2 temporarily to be in the M mode, attempts to actually change the mode from the Auto mode to the M mode, but does not detect that the output voltage Vout recovers to the value Vin indicated by a two-point dashed line when the predetermined time T4 has elapsed after it is detected that the shift-up SW 4A and the shift-down SW 4B are substantially simultaneously operated, and detects the value V2 and determines that the shift-down SW 4B is in a fixed defective condition, thereby cancelling a mode change from the Auto mode to the M mode.

Even if the mode change to the M mode is successful through the previous substantially simultaneous operation to the shift-up SW 4A and the shift-down SW 4B, the microcomputer 52 reads the value of the output voltage Vout by the switch-operation-signal output circuit 51 at a time point at which the predetermined time T4 has elapsed right after the shift-up SW 4A and the shift-down SW 4B are substantially simultaneously turned on, and checks whether or not the output voltage Vout by the switch-operation-signal output circuit 51 stands at the value Vin. Only when such an output voltage is equal to the value Vin, a mode change to the M mode is permitted from then on, and when such an output voltage is not equal to the value Vin, the determination result at the step S07 in the whole flowchart of FIG. 5 becomes NO since IFLAG B is not equal to zero. Accordingly, the process progresses to the step S41, and the automatic transmission 2 is forcibly set to be in the Auto mode, and the M mode is not permitted in which either one of the shift-up SW 4A and the shift-down SW 4B is operable. As a result, the mode change control method between the Auto mode and the M mode of the automatic transmission 2 facilitates the driver to drive the vehicle.

Also, the number of systems for inputting the output voltage Vout by the switch-operation-signal output circuit 51 into the microcomputer 52 is one, so that the signal wiring in the control device 5 can be simplified.

Furthermore, the switch-operation-signal output circuit 51 is set so that the output voltage Vout thereof becomes different from respective values V1, V2, and V3 depending on the on/off-state of the shift-up SW 4A and the shift-down SW 4B and 0 at the time of a disconnection defect. Hence, a fixed defect determination of each of the shift-up SW 4A and shift-down SW 4B and a determination for a disconnection defect can be easily carried out.

Modified Embodiment

In the above-explained embodiment, every time the microcomputer 52 detects that the select lever 34 is selected from the positions "P", "R", and "N" to the position "D" through the select position SW 36, the microcomputer 52 executes a defect determination of the switch-operation-signal output circuit 51 in the step S05 "defect determination of switch-operation-signal output circuit right after select lever position "D" is selected" in the whole flowchart of FIG. 5. However, the present invention is not limited to this configuration.

Regarding resetting of the IFLAG A so as to be 0 in the step S04, a defect determination of the switch-operation-signal output circuit 51 in the step S05, and the process of indicating a defect mode depending on the value of IFLAG A in the step S11, the output voltage Vout by the switch-operation-signal output circuit 51 may be monitored by one time during the predetermined time T3 after the ignition key is turned on with the select lever 34 still being selected at the "P" position, the steps S51 to S72 in FIGS. 8 and 9 may be executed, and then the process may progress to the step S01 in the whole flowchart of FIG. 5. In this case, the step S04 in the whole flowchart of FIG. 5 is read as "reset to IFLAG B=0", and the process following the step S04 is read as a progression to the step S06. Also, the step S11 is executed before the step S01.

According to this modified embodiment, the output voltage Vout by the switch-operation-signal output circuit 51 is monitored at least once after the ignition key is turned on and the engine is started during the predetermined time T3 longer than the predetermined time T1 (more specifically, "T1A" or "T1B" in FIGS. 11 to 13). Next, based on the monitoring result, a defect determination of the switch-operation-signal output circuit 51 is surely executed, and if IFLAG A is not zero, when the microcomputer 52 detects that the select lever position is the "D" position, a mode change from the Auto mode to the M (manual) mode is prohibited.

As a result, the driver can know the defect determination result of the switch-operation-signal output circuit 51 based on an error code indication right after the ignition key is turned on. Accordingly, the driver is quickly informed of a prohibition of a mode change operation from the Auto mode to the M mode by the microcomputer 52 even though the shift-up SW 4A and the shift-down SW 4B are operated, which does not make the driver upset during the driving, and thus it is convenient for the driver.

What is claimed is:

1. A control device for an automatic transmission that is operated in an automatic mode in which a gear range of the automatic transmission is automatically controlled and a manual mode in which the gear range is changeable one by one upon operation of either one of a shift-up switch and a shift-down switch, comprising:
   a switch-operation-signal output circuit that outputs different output voltages at least when only the shift-up switch is turned on and when only the shift-down switch is turned on; and
   an operation determination unit which determines a mode change between the automatic mode and the manual mode based on the output voltage by the switch-operation-signal output circuit and which determines a change of the gear range in the manual mode, wherein the switch-operation-signal output circuit:
outputs a predetermined first output voltage when both shift-up switch and shift-down switch are in an off-state,
outputs a second output voltage different from the first output voltage when the shift-up switch is turned on,
outputs a third output voltage different from the first and second output voltages when the shift-down switch is turned on,
outputs a fourth output voltage different from the first, second and third output voltages when the shift-up switch and the shift-down switch are simultaneously turned on, and wherein the operation determination unit maintains the automatic mode until both shift-up switch and shift-down switch are operated within a predetermined first threshold time, and switches to the manual mode from the automatic mode when the fourth output voltage is output within the predetermined first threshold time or the second output voltage and the third output voltage are both output within the predetermined first threshold time.

2. The automatic-transmission control device according to claim 1, wherein
the operation determination unit monitors the output voltage by the switch-operation-signal output circuit at least once after an engine is started through an ignition key during a second threshold time that is longer than the predetermined first threshold time, and when detecting no first output voltage, determines that the switch-operation-signal output circuit is defective and prohibits a mode change to the manual mode.

3. The automatic-transmission control device according to claim 1, wherein
the operation determination unit
monitors whether or not the output voltage output after a third threshold time has elapsed recovers to the first output voltage when both shift-up switch and shift-down switch are operated within the predetermined first threshold time, and
when detecting that the output voltage by the switch-operation-signal output circuit does not recover to the first output voltage after the third threshold time has elapsed, determines that at least either one of the shift-up switch and the shift-down switch is defective.

4. The automatic-transmission control device according to claim 3, wherein the operation determination unit
monitors whether or not the output voltage output after a third threshold time has elapsed recovers to the first output voltage when both shift-up switch and shift-down switch are operated within the predetermined first threshold time, and
when detecting that the output voltage by the switch-operation-signal output circuit does not recover to the first output voltage after the third threshold time has elapsed,
determines that at least either one of the shift-up switch and the shift-down switch is defective and prohibits a mode change to the manual mode when the automatic transmission is in the automatic mode, and
determines that at least either one of the shift-up switch and the shift-down switch is defective and permits a mode change to the automatic mode when the automatic transmission is in the manual mode.

5. The automatic-transmission control device according to claim 1, wherein
the operation determination unit
monitors whether or not the output voltage output after a third threshold time has elapsed recovers to the first output voltage when both shift-up switch and shift-down switch are operated within the predetermined first threshold time, and
when detecting that the output voltage by the switch-operation-signal output circuit does not recover to the first output voltage after the third threshold time has elapsed,
prohibits a mode change to the manual mode when the automatic transmission is in the automatic mode, and
permits a mode change to the automatic mode when the automatic transmission is in the manual mode.

6. The automatic-transmission control device according to claim 1, wherein the operation of the shift-up switch and the shift-down switch within the predetermined first threshold time occurs sequentially.

7. The automatic-transmission control device according to claim 1, wherein the operation of each of the shift-up switch and the shift-down switch includes an activation of the switch followed by a deactivation of the switch.

8. The automatic-transmission control device according to claim 1, wherein the predetermined first threshold time is greater than zero.

9. The automatic-transmission control device according to claim 1, wherein in a case where the vehicle is stopped, a first gear of the manual mode is set when the shift up switch and the shift down switch are operated substantially simultaneously and the manual mode is set.

* * * * *